US009965461B2

(12) United States Patent
Jackson

(10) Patent No.: US 9,965,461 B2
(45) Date of Patent: May 8, 2018

(54) SYSTEMS AND METHODS FOR IMPROVING THE EFFICIENCY OF SYNTACTIC AND SEMANTIC ANALYSIS IN AUTOMATED PROCESSES FOR NATURAL LANGUAGE UNDERSTANDING USING ARGUMENT ORDERING

(71) Applicant: The Software Shop, Inc., Apex, NC (US)

(72) Inventor: Jeffrey Jackson, Apex, NC (US)

(73) Assignee: The Software Shop, Inc., Apex, NC (US)

( * ) Notice: Subject to any disclaimer, the term of this patent is extended or adjusted under 35 U.S.C. 154(b) by 0 days. days.

(21) Appl. No.: 14/195,500

(22) Filed: Mar. 3, 2014

(65) Prior Publication Data

US 2014/0249802 A1    Sep. 4, 2014

Related U.S. Application Data

(60) Provisional application No. 61/771,105, filed on Mar. 1, 2013.

(51) Int. Cl.
G06F 17/27    (2006.01)
G06F 17/28    (2006.01)

(52) U.S. Cl.
CPC ........ *G06F 17/2785* (2013.01); *G06F 17/271* (2013.01); *G06F 17/274* (2013.01);
(Continued)

(58) Field of Classification Search
CPC ..... G06F 17/271; G06F 17/2785; G06F 17/28
See application file for complete search history.

(56) References Cited

U.S. PATENT DOCUMENTS 4,887,212 A    12/1989  Gunther et al.
4,914,590 A     4/1990  Loatman et al.
(Continued)

FOREIGN PATENT DOCUMENTS

EP    1302861 B    4/2009
EP    1341095 B1   5/2009
(Continued)

OTHER PUBLICATIONS

Langkilde, Irene, and Kevin Knight. "The Practical Value of N'Gran Is in Generation." Procs. of the 9th International Natural Language Workshop. 1998.*
(Continued)

*Primary Examiner* — Paras D Shah
*Assistant Examiner* — Bryan S Blankenagel
(74) *Attorney, Agent, or Firm* — Olive Law Group, PLLC

(57) ABSTRACT

A natural language understanding system may be given the capability to construct a semantically detailed parse tree for each acceptable interpretation of an input natural language expression (or fewer such parse trees than interpretations) by independently solving sub-trees corresponding to various series of post nominal modifiers and associating those partial solutions with corresponding nodes in the overall parse tree. The argument order in predicate calculus atomic formulas may be standardized in a manner that supports the use of a chart parser applied to a head-driven phase structure grammar and that permits a simplified more tractable grammar that in turn can be used as a domain general semantic grammar.

24 Claims, 13 Drawing Sheets

(52) U.S. Cl.
CPC .......... *G06F 17/28* (2013.01); *G06F 17/2705* (2013.01); *G06F 17/2735* (2013.01)

(56) References Cited

U.S. PATENT DOCUMENTS

| | | | | |
|---|---|---|---|---|
| 5,101,349 | A * | 3/1992 | Tokuume | G06F 17/271 704/9 |
| 5,146,406 | A | 9/1992 | Jensen | |
| 5,424,947 | A | 6/1995 | Nagao et al. | |
| 5,475,588 | A | 12/1995 | Schabes et al. | |
| 5,649,215 | A | 7/1997 | Itoh | |
| 5,687,384 | A | 11/1997 | Nagase | |
| 5,930,746 | A | 7/1999 | Ting | |
| 6,332,118 | B1 | 12/2001 | Yamabana | |
| 6,658,377 | B1 * | 12/2003 | Anward | G06F 17/271 704/9 |
| 7,027,974 | B1 | 4/2006 | Busch et al. | |
| 7,058,567 | B2 | 6/2006 | Ait-Mokhtar et al. | |
| 7,113,905 | B2 | 9/2006 | Parkinson et al. | |
| 7,236,925 | B2 | 6/2007 | Moore | |
| 7,249,117 | B2 * | 7/2007 | Estes | G06N 5/022 706/18 |
| 7,302,384 | B2 | 11/2007 | Moore | |
| 7,313,515 | B2 * | 12/2007 | Crouch | G06N 5/02 704/9 |
| 7,574,347 | B2 | 8/2009 | Wang | |
| 7,630,892 | B2 | 12/2009 | Wu | |
| 7,702,500 | B2 | 4/2010 | Blaedow | |
| 7,711,672 | B2 * | 5/2010 | Au | 706/55 |
| 7,739,104 | B2 | 6/2010 | Berkan et al. | |
| 7,865,352 | B2 * | 1/2011 | Suzuki et al. | 704/2 |
| 7,890,539 | B2 | 2/2011 | Boschee et al. | |
| 8,024,177 | B2 | 9/2011 | Lenat et al. | |
| 8,332,394 | B2 | 12/2012 | Fan et al. | |
| 8,335,690 | B1 | 12/2012 | Bansal et al. | |
| 2001/0053968 | A1 * | 12/2001 | Galitsky et al. | 704/9 |
| 2003/0110037 | A1 * | 6/2003 | Walker | G10L 13/027 704/257 |
| 2003/0182102 | A1 * | 9/2003 | Corston-Oliver | G06F 17/2881 704/9 |
| 2003/0216919 | A1 * | 11/2003 | Roushar | G06F 17/277 704/260 |
| 2004/0193401 | A1 * | 9/2004 | Ringger | G06F 17/2715 704/9 |
| 2006/0004563 | A1 * | 1/2006 | Campbell et al. | 704/9 |
| 2006/0100855 | A1 * | 5/2006 | Rozen | G06F 17/279 704/9 |
| 2007/0179776 | A1 * | 8/2007 | Segond et al. | 704/9 |
| 2008/0228467 | A1 * | 9/2008 | Womack | G06F 17/271 704/9 |
| 2009/0144609 | A1 * | 6/2009 | Liang | G06F 17/21 715/230 |
| 2010/0198592 | A1 * | 8/2010 | Potter | G10L 15/1822 704/233 |
| 2014/0108424 | A1 * | 4/2014 | Casella dos Santos | G06F 17/30598 707/748 |
| 2014/0249801 | A1 | 9/2014 | Jackson | |
| 2014/0249803 | A1 | 9/2014 | Jackson | |
| 2014/0249804 | A1 | 9/2014 | Jackson | |

FOREIGN PATENT DOCUMENTS

| | | |
|---|---|---|
| EP | 2169562 A1 | 3/2010 |
| WO | 0101289 A1 | 1/2001 |

OTHER PUBLICATIONS

Knoeferle, Pia, et al. "The influence of the immediate visual context on incremental thematic role-assignment: Evidence from eye-movements in depicted events." Cognition 95.1 (2005): 95-127.*

McCord, M. C. et al.; Deep parsing in Watson, IBM Journal of Research and Development, vol. 56, No. 3/4, Paper 3, May/Jul. 2012.

Allen, James; excerpts from Natural Language Understanding; Second Edition; 1995; The Benjamin/Cummings Publishing Company, Inc., Redwood City, CA; pp. 46-69.

Genesereth, Michael; excerpts from Logical Foundations of Artificial Intelligence; 1987; Morgan Kaufmann Publishers, Inc. Los Altos, CA; pp. 14-20.

Office Action dated Aug. 17, 2015 for U.S. Appl. No. 14/195,529, related patent application.

Non-Final Office Action in related U.S. Appl. No. 14/195,556 dated Jan. 13, 2016.

Final Rejection in related U.S. Appl. No. 14/195,529 dated Mar. 4, 2016.

* cited by examiner

ASSOCIATIONS BETWEEN GRAMMAR RULE ELEMENTS AND TRAVELING FEATURE VALUES

CONNECTING TWO PARTIAL PARSE TREES TO FORM A THIRD PARTIAL PARSE TREE.

SYSTEMS AND METHODS FOR IMPROVING THE EFFICIENCY OF SYNTACTIC AND SEMANTIC ANALYSIS IN AUTOMATED PROCESSES FOR NATURAL LANGUAGE UNDERSTANDING USING ARGUMENT ORDERING

CROSS REFERENCE TO RELATED APPLICATIONS

This application claims the benefit of U.S. Provisional Patent Application No. 61/771,105, filed Mar. 1, 2013 and titled SYSTEMS AND METHODS FOR IMPROVING THE EFFICIENCY OF SYNTACTIC AND SEMANTIC ANALYSIS IN AUTOMATED PROCESSES FOR NATURAL LANGUAGE UNDERSTANDING, the content of which is hereby incorporated herein by reference in its entirety. This application is related to U.S. patent application Ser. No. 14/195,456, filed simultaneously herewith and titled SYSTEMS AND METHODS FOR IMPROVING THE EFFICIENCY OF SYNTACTIC AND SEMANTIC ANALYSIS IN AUTOMATED PROCESSES FOR NATURAL LANGUAGE UNDERSTANDING, the content of which is hereby incorporated herein by reference in its entirety. This application is related to U.S. patent application Ser. No. 14/195,529, filed simultaneously herewith and titled SYSTEMS AND METHODS FOR IMPROVING THE EFFICIENCY OF SYNTACTIC AND SEMANTIC ANALYSIS IN AUTOMATED PROCESSES FOR NATURAL LANGUAGE UNDERSTANDING USING TRAVELING FEATURES, the content of which is hereby incorporated herein by reference in its entirety. This application is related to U.S. patent application Ser. No. 14/195,556, filed simultaneously herewith and titled SYSTEMS AND METHODS FOR IMPROVING THE EFFICIENCY OF SYNTACTIC AND SEMANTIC ANALYSIS IN AUTOMATED PROCESSES FOR NATURAL LANGUAGE UNDERSTANDING USING GENERAL COMPOSITION, the content of which is hereby incorporated herein by reference in its entirety.

TECHNICAL FIELD

The present disclosure relates to natural language understanding. More particularly, the present disclosure relates to improving the efficiency of syntactic and semantic analysis in automated processes for natural language understanding.

BACKGROUND

Natural language understanding (NLU) has the goal of programming computers to simulate understanding of natural languages by computers in order for them to perform actions involving language including answering questions, finding specified kinds of facts in ordinary "unstructured" text, and carrying on a dialog with humans in a natural language. Broadly speaking there are two approaches to NLU, symbolic and statistical, although combinations of the two often prove best. The symbolic approach typically involves rule-based methods and a knowledge representation language (KRL) such as lambda calculus or predicate calculus. Symbolic NLU systems analyze the meaning of English expressions in the process of constructing expressions in their KRL. These KRL expressions represent the meaning of the input English in a manner that is typically less ambiguous than the input English and in a manner that can be used subsequently by computers for inference and analysis. Natural languages such as English are inherently ambiguous in many ways. Much of the challenge in devising NLU systems involves finding ways to appropriately and efficiently reduce or eliminate such ambiguity as the data structures of the KRL are constructed.

The ultimate goal of NLU is to enable computer programs to understand and communicate using spoken and written language at least as well as adult native speakers of a natural language communicate with each other. The current state of the art is far from reaching this goal, although current technology does a good job for restricted or specialized applications, such as answering questions on a predetermined set of topics, finding documents or sentences that are related to a given phrase or to key words, or interacting with a human user in a restricted manner to make airline reservations. Even early systems could appear to understand language far beyond their actual capabilities because users tend to see human-like intelligence where it does not exist. For example an early NL program imitated a psychologist and asked questions such as "How does this make you feel?". This system simply matched parts of the input statements from the user to a prefabricated list of responses and used a few stock phrases, such as "Tell me more about that" to fall back on when no matches were found.

When computer programs can: (1) carry on a sustained dialog, (2) keep track of the current topic and changes in that topic, (3) initiate and respond to communication goals appropriately, (4) make appropriate inferences during the dialog, (5) handle the many non-literal uses of language such as metaphor, (5) understand what the other parties in a dialog probably understand or need to know, and (6) guess appropriately about what the communication goals of the other dialog participants may be as the dialog progresses these may be indications that we are approaching the achievement of NLU's ultimate goal. All of these aspects of natural language communication are being investigated in the academic community. It has been argued that NLU is "Artificial Intelligence complete," meaning that most of the goals of the broader field of Artificial Intelligence will need to be solved to reach this overall NLU goal.

Many of these performance criteria can currently be achieved for specialized applications, where the goals of the dialog and the language itself are limited. The key indicator that NLU systems have achieved something comparable to human-level competence may be their capability to perform the listed actions on an unlimited variety of subjects as human beings can. Of course, progress in any area has the potential to enable new commercial applications. Also, progress in increasing the generality of NLU systems means that fewer new distinct commercial products must be developed (or developed from scratch) to address new applications. The value of successfully developing more broadly capable NLU systems easily justifies the cost of gathering the additional knowledge needed to support their operation. The key is to demonstrate that a less specialized system can support new applications once its vocabulary and knowledge are large enough. Similar arguments have been made for the even more ambitious goal of creating a general artificial intelligence.

In about the last two decades much NLU research has emphasized statistical analysis primarily to minimize or to avoid applying large sets of hand crafted rules about language structure and use, which are labor intensive to collect. Unlike symbolic or rule-based approaches, these statistical approaches seek to avoid depending on large manually or semi-manually acquired collections of general common sense knowledge, domain specific knowledge and detailed specifications of grammar. Limitations of symbolic approaches that are often cited by advocates of statistical approaches include the changing and expanding nature of proper grammar and vocabulary as well as the labor intensive nature of specifying the kind of complex declarative knowledge just described.

Statistical approaches have their own limitations. Some statistical methods attempt to train the NL system based on a "training set" of hand annotated example problem-solution sets. These annotations can range from syntactic categories of words and phrases to a variety of "tags" that indicate semantic information. In contrast "unsupervised" training techniques require the system to achieve the desired performance by learning from example problem-solution pairs without any annotations being provided. The field concerned with ways to train computer programs in these ways is "machine learning".

Some applications of NL, such as translating from one natural language to another, can achieve fairly high performance (at least on a first pass prior to review by expert human translators) without constructing any expressions in a knowledge representation language. Consequently, statistical techniques are appropriate for many translation tasks. Other applications such as question answering benefit significantly from the use of a KRL. The KRL can reflect details of NL such as how statements are quantified and whether or not they are negated. Such linguistic features are key for question answering. Machine leaning has difficulty coping with such features in the absence of a KRL. Recently at least one research group has begun to combine machine learning with the construction of a KRL by using problem-solution pairs that involve a small number of hand-crafted templates of expressions in a KRL that have associated parameters. When values of the parameters for their templates are determined, the resulting expressions resemble predicate calculus. For their system the machine learning task is to map expressions in natural language to these templates with the correct values of the parameters substituted, resulting in a fully specified expression in their KRL. One of their central challenges was to design the templates so that existing machine learning algorithms would be effective.

In view of the foregoing, it is desired to provide systems and methods for improving the efficiency of syntactic and semantic analysis in automated processes for NLU.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for improving the efficiency of syntactic and semantic analysis in automated processes for natural language understanding, for enabling the use of simpler natural language grammar, and for enabling the use of standardized logic-based representations of meaning partly to gain some of the advantages of semantic grammars (often associated with restricted domains of application) for NLU systems that are not restricted to any particular domains of application. In this regard, in one embodiment, a method comprises using a processor and memory for receiving a natural language phrase comprising at least one token. The method further comprises receiving a plurality of thematic role sequences, wherein each one of the plurality of thematic role sequences corresponds to a sequence of predicate arguments. The method further comprises applying the plurality of thematic role sequences to a natural language predicating expression. The method further comprises translating the natural language phrase into an artificial language predicating expression based on the application of the plurality of thematic role sequences to the natural language predicating expression.

In this regard, in another embodiment, a method comprises a processor and memory for receiving a specification of at least one first grammar rule element of a first grammar rule as an origin of a traveling feature. The method further comprises receiving a traveling feature value calculating process associated with the at least one first grammar rule element. The method further comprises associating a natural language expression part with one of the at least one first grammar rule element. The method further comprises applying the traveling feature value calculating process to the one of the at least one first grammar rule element and to the natural language expression part for identifying any first values of the traveling feature. The method further comprises constructing a first node, based on the application of the traveling feature value calculating process.

In this regard, in another embodiment, a method comprises using at least a processor and memory for receiving a first natural language phrase. The method further comprises identifying at least one modifier natural language phrase comprised within the first natural language phrase.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
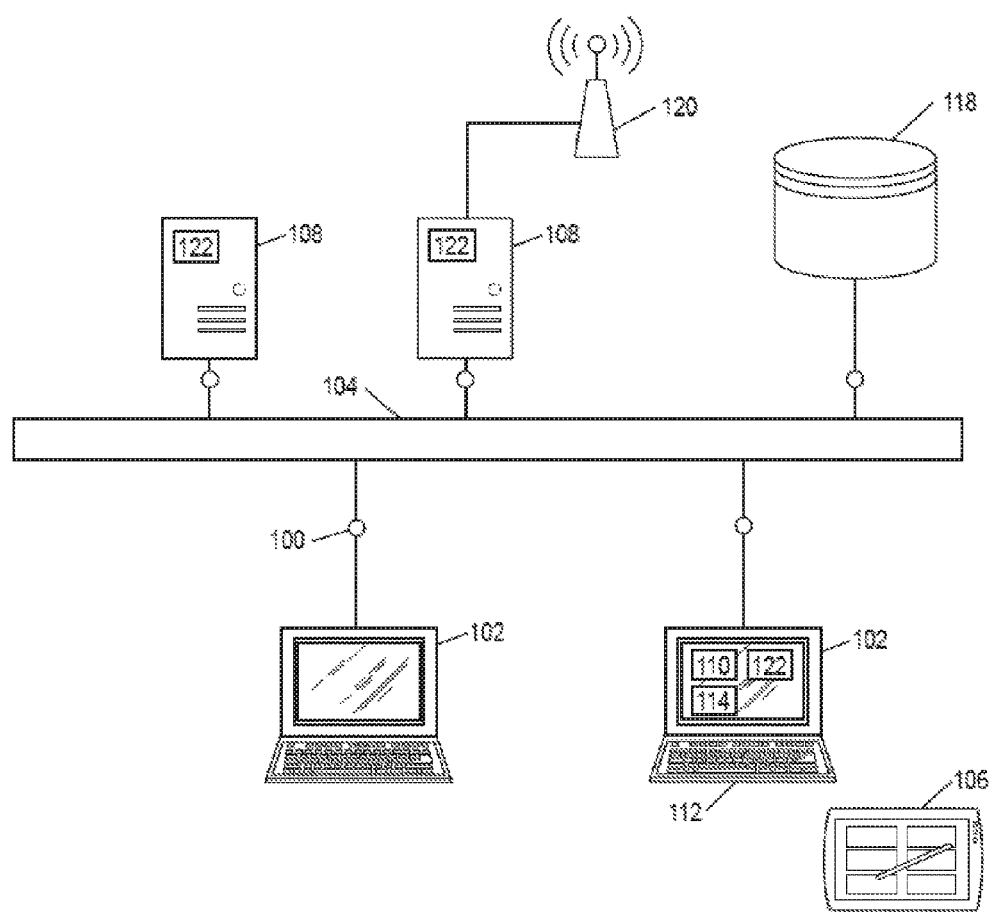
FIG. 1 is a block diagram of a system for improving the efficiency of syntactic and semantic analysis in automated processes for natural language understanding according to embodiments of the present invention.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

A natural language is a language such as, for example, English or French.

As referred to herein, a natural language phrase is a sequence of one or more words.

As referred to herein, a token is an occurrence of a symbol to which meaning can be attributed and that has no meaningful occurrence of any symbol as a component. As an example, tokens include occurrences of words, occurrences of punctuation marks.

As referred to herein, a natural language expression is any sequence of one or more tokens of a natural language that are treated as a syntactic or meaningful unit of that natural language. As a non-limiting example, a natural language expression may be referred to as an expression. A natural language predicating expression is a natural language expression that may be interpreted as expressing a relationship among entities or that expresses one or more properties or characteristics of an entity or entities. Non-limiting examples include sentences, adjective phrases, and prepositional phrases. As a non-limiting example, a natural language predicating expression may be referred to as a natural language expression. As another non-limiting example, a natural language predicating expression may be referred to as a predicating expression.

As referred to herein, a natural language predicating expression part comprises one or more natural language expressions. As a non-limiting example, a natural language predicating expression part may be referred to as a natural language expression. As another non-limiting example, a natural language predicating expression part may be referred to as an English expression.

As referred to herein, a thematic role is an element of a thematic role sequence. As a non-limiting example, a first thematic role sequence may be referred to as a thematic role sequence. As another non-limiting example, the first thematic role sequence may be referred to as an expressed role sequence. As another non-limiting example, the first thematic role sequence may be referred to as a thematic role sequence that reflects thematic roles actually expressed. As a non-limiting example, a second thematic role sequence may be referred to as a master role sequence. As another non-limiting example, second thematic role sequence may be referred to as a thematic role sequence.

As referred to herein, an artificial language predicating expression argument place is a correspondence between an artificial language predicating expression argument and some aspect of an artificial language predicating expression. As a non-limiting example, an artificial language predicating expression argument place may refer to a location in an artificial language predicating expression. As a non-limiting example, an artificial language predicating expression argument place may be referred to as an argument place. As a non-limiting example, an artificial language predicating expression may be referred to as a logical predicate. As another non-limiting example, an artificial language predicating expression may be referred to as a predicate. As another non-limiting example, an artificial language predicating expression may be referred to as a knowledge representation. As another non-limiting example, an artificial language predicating expression may be referred to as a predicate representation. As a non-limiting example, an artificial language predicating expression argument may be referred to as a data structure. As another non-limiting example, an artificial language predicating expression argument may be referred to as an argument.

As referred to herein, a data structure comprises at least one symbol wherein the data structure may comprise the arrangement of the at least one symbol. As a non-limiting example, a partial meaning may be referred to as a sense.

As referred to herein, a grammar rule is a specification of one or more acceptable natural language expressions.

As referred to herein, a grammar rule element is a part of a grammar rule that corresponds to a second natural language expression wherein the second natural language expression is comprised by the natural language expression specified as acceptable by the grammar rule.

As referred to herein, a feature is an entity associated with a grammar rule that may be associated with a grammar rule element wherein the feature may have associated values. As a non-limiting example, a feature may be referred to an attribute.

As referred to herein, a traveling feature value calculating process corresponds to any means whereby one or more values for a traveling feature are identified.

As referred to herein, a node is a component of a parse tree, wherein the parse tree may be a partial parse tree and wherein the node may correspond to a grammar rule element in accordance with a grammar rule.

As referred to herein, a component may be recorded in the chart of a chart parser and may record information about natural language expressions and information about tokens. As a non-limiting example, a component may be referred to as an edge. As another non-limiting example, a component may be referred to as a node.

As referred to herein, a modifier is a natural language expression that modifies a second natural language expression. As a non-limiting example, a modifier may be referred to as a modifying expression.

As referred to herein, a modifiee is a natural language expression that is modified by a second natural language expression. As a non-limiting example, a modifiee may be referred to as a target.

As referred to herein, a compatible sense may be referred to as complementary sense.

As referred to herein, a node is a component of a chart of a chart parser.

The system and inventions described herein are in the technical field of computational linguistics. Computational linguistics (CL) deals with technology that enables computers to deal with natural languages such as English (as opposed to artificial programming languages used to program computers, such as C and Java). It is influenced and informed by the related fields of linguistics (the general study of natural languages), computer science, and the philosophy of language. CL includes the task of "natural language understanding" (NLU).

Although some of the mechanisms and methods disclosed are not limited to the use of chart parsers for NLU, much of the description of the use of those items is provided in the context of the application of a chart parser. Consequently, a review of some aspects of the operation of chart parsers can provide appropriate background information. Some parsers are used to determine which words and phases are syntactic components of other words and phrases. A typical end product (output) of such a parser is a parse tree. A parse tree is a graph in the form of a tree in which each child node has only one parent and the top-most node has no parent. For example, a sentence may consist of a proper noun acting as the subject of the sentence, a verb, and another proper noun acting as the direct object of the sentence, such as 'Mary saw John'. In this case the only parse tree has three levels with the words 'Mary', 'saw', and 'John' on the bottom level, their respective categories (proper_noun, verb, proper_noun) on the middle level and a node of a category such as S (for sentence) as the root at the top level. Each node in a parse tree is often labeled with its syntactic category, but any useful information may be associated with the nodes of parse trees.

Parsers, including chart parsers, use a grammar for the natural language being analyzed that specifies which sequences of words and phrases are acceptable as a part of that language. Any English grammar can be used to specify which expressions are proper and which are not, and there is no universal agreement about what constitutes all syntactically correct English expressions. For example, in a current implementation of our system the English grammar is a "head driven phrase structure grammar" (HPSG) designed to facilitate the construction of the KRL. A HPSG specifies which words and phrases are components of which other words and phrases. There are other flavors of grammars, for instance a "dependency grammar" is cast in terms of which words "depend" on which other words. In a dependency grammar, a modifier is considered to depend on the word it modifies and a complement is considered to depend on the verb to which it belongs. The inventions disclosed herein are described in the context of their use with a phase structure grammar and, as already described, as applied using a top-down chart parser. Incidentally, the emphasis on modifier-modifiee pairs in the approach described below provides some of the advantages usually associated with a dependency grammar to the system described here.

A chart parser records a set of syntactic "components" (words and phrases) as it is discovered according to the grammar that they may occur at particular places in the input expression. Components are sometimes called edges or nodes. They are called "nodes" subsequently in this document. For instance, the grammar may permit the noun phrase 'four dogs under the chair' to occur from position 5 to position 10 in an input expression. One method of keeping track of word positions in a chart parser is to label the position before the first word '0', label other positions between words with successive integers and label the position after the last word with the final integer. Information to keep track of for each component is its syntactic category such as noun, adjective, article, etc. and its location in the input expression, which can be viewed as a sequence of words. During the operation of a chart parser, nodes that correspond to complete expressions of their syntactic category are constructed incrementally. For example, the noun phrase 'the four dogs' could be sanctioned by the grammar rule np→[art, integer, noun]. Chart parsers can operate either top-down or bottom-up. The top-down approach would use this grammar rule by starting with the goal of constructing a np and scanning the input to the right of its current position to determine whether or not the subsequent words permit the construction of a np. The node, [k, k, np, { }, N], is introduced, where k is an integer that gives the current position and the empty list, { }, indicates that no children have yet been assigned to that node. K appears twice because, having no children yet, the node starts and ends at the same position in the input. N is an identifying integer for the node, unless that node corresponds to a word. As each input word is scanned left-to-right, a new arc is constructed by adding one more child node to the, initially empty, list of child nodes. When the last child node of the proper syntactic category according to the grammar rule is added, the node is considered "complete". Prior to that, the node is considered "incomplete". For example, the sequence of node constructions for the phrase 'the four dogs' could be as follows.

1. [0, 0, np, { }, 1], To start with the top-level category.
2. [0, 0, art, { }, 2], Because the grammar rule specifies that a "np" can start with an "art".
3. [0, 1, "the"], The word 'the' is scanned and an arc for it (with no possible children) is created. Also nodes for words do not need an identifier, because the word and its location uniquely identify such nodes.

4. [0, 1, art, {[0, 1, "the"]}, 3]—Here node 2 is "extended" by [0, 1, "the"] to construct node 3.
5. [0, 1, np, {[0, 1, art, 3]}, 4]—Child node 3 extends node 1 to construct node 4.
6. [1, 1, integer, { }, 5]—Because the grammar rule specifies that an integer can follow the article.
7. [1, 2, "four"]—The word 'four' is scanned and an arc for it created.
8. [1, 2, integer, {[1, 2, "four"] }, 6]—Node[1, 2, "four"] extends node 5 to construct node 6.
9. [0, 2, np, {[0, 1, art, 4], [1, 2, integer, 6] }, 7]
10. [2, 2, noun, { }, 8]
11. [2, 3 "dogs], The word 'dogs' is scanned and its arc created.
12. [2, 3, noun, {[2, 3, "dogs"]}, 9]
13. [0, 3, np, [{[0, 1, art, 5], [1, 2, noun, 6], [2, 3, noun]} 10]

At this point the noun phrase 'the four dogs' has been recognized, as indicated by node 10. If a specification of the children of children is kept as the nodes are extended, a representation of the sub-tree under each node can be associated with that node. If this data is retained, then when a node is found, such as node 10 in the example, that extends from the beginning to the end of the input expression then the sub-tree under that node is an entire parse tree for the input.

Nodes that correspond to individual words are added to the chart as the input is scanned, by adding one node for each allowed syntactic category of the word. All the grammar rules that apply are considered as the input is scanned left-to-right to form all the nodes that the grammar as a whole permits. All the nodes both, incomplete and complete are retained. As part of this process, a separate list of complete nodes called the agenda can be maintained. The agenda may be used to make sure that all complete nodes that begin at the current position are considered as possible children of all the incomplete nodes in the chart that require a child at that position to continue their construction. One can think of nodes as being extended when a child is added, but it may helpful to think of a node as being related to a distinct node that is identical, but has one more child than the first. This is because incomplete nodes are kept in the chart in case new ways of "extending" them are found and new complete nodes are finished and can be considered as potential children. An incomplete node may happen to have no children added until the entire input expression is completely scanned. Then a cascade of node completions from the bottom up may result in that node's extension that are triggered by the addition of the last word scanned. Parse trees consist only of complete nodes. A good description of chart parsers can be found in James Allan's Natural Language Understanding, The Benjamin/Cummings Publishing Company, Inc., 1995.

List:
1. Scan input expression (usually one sentence) and construct the chart.
2. Identify the alternative ordered child sets for each node in the chart and other related data.
3. Perform rule-by-rule bottom-up semantic composition as if all modifier-modifiee pairs contained siblings in potential parse trees, postponing any determination of which modifiers modify which modifiees where any series of modifying expressions is involved.
4. If any modifier has more than one candidate modifiee, separately determine coherent pairings of modifiers with modifiees.
5. Convert the data structures that represent the meaning of the input expression into a set of relatively simple facts in a standardized form. (The variety of these "simple" facts can be expanded along with the system's vocabulary and knowledge.)
6. Backtrack into steps 4 through 6 to derive additional interpretations of the input expression.

Completing the construction of the chart does not necessarily complete the parsing process. Although one or more parse trees are implicit in the contents of the chart, they may still need to be identified. If the respective sub-trees for the nodes have not been constructed as each node in the chart is created, then the parse trees may still be constructed. Each parse tree can be constructed by selecting nodes from the chart and children for each node until a tree of nodes has been constructed where the root of the tree has the desired syntactic category of the entire input expression as a whole and each node's children is a set of children that were found as nodes were completed during chart construction. In some systems the parse trees are constructed at one stage and then passed along to the next stage of processing which performs semantic analysis on each parse tree to determine whether or not any interpretations (meanings) can be found for each parse tree. Such systems are said to have a "pipelined" system architecture. Systems that do not have a purely pipelined architecture can use alternative methods to limit parse tree construction by combining semantic analysis with the parse tree construction. Systems can follow the principle of having one semantic composition rule for each grammar rule. The semantic composition rule specifies how to determine the meaning of the parent node from the meaning of that node's child nodes. A formalism named lambda calculus is often used to compose meaning representations simultaneously with the composition of the corresponding parts of parse trees; however lambda calculus expressions can become extremely complex and it can be impractical to support inference and analysis based on the resulting meaning representations.

To limit the number of grammar rules required, "features" may be used, each specifying a particular property of a node. Features may also use variables to specify that the values of specified features of child nodes must be the same, must "agree". For example, to handle singular and plural words without using features two grammar rules might be
S→[pronoun_number_plural, verb_number_plural, adj]
and
S→[pronoun_number_singular, verb_number_singular, adj].

As the number of properties of nodes and the number of values of those properties increase, the number of grammar rules in the absence of features would proliferate. In contrast, one can use features as in the following grammar rule.
S→[pronoun_number=X, verb_number=X, adj].

Using the feature "number" and requiring that the value of X be the same for both occurrences of the variable does the job of both grammar rules that do not use features. In general the agreement of features is enforced using a process called "unification". In unification, lists of alternative values of each feature are used. A node may have one list of values for a feature and a potential child of that node can have another list of values for that same feature. The potential child can be added as an actual child to the parent node if those two lists of values "agree". Two lists agree if their intersection is non-empty and the list for the parent node being extended by the child node contains that non-empty intersection of values. If either node has a list of values for a feature and the other node has no list for that feature, then the lists agree and the new node being created gets the list from whichever node has one for that feature.

The inventions disclosed herein involve the introduction of various features whose use conforms to the traditional behavior of features and use of unification. A new kind of features is also introduced called "travelling features" that have a different behavior. Travelling features are used to mark paths through potential parse trees as the chart is being constructed. Unlike traditional features, there is no issue of agreement. Instead, the values of travelling features accumulate at all the nodes they reach. Because travelling features propagate to nodes throughout the chart during chart construction, combinations of them can be used to detect and record syntactic relationships in parse trees, before those parse trees are constructed. The primary current use of travelling features in the current system is to identify English words and phrases that are potential modifiers of other words and phrases strictly by virtue of syntactic considerations.

If
1. Lambda calculus yielded tractable expressions for inference and analysis and
2. The approach of using one semantic composition rule for each grammar rule could be followed without multiplying (at least within certain sub-trees) the number of parse trees for every modifier-modifiee combination, and
3. The related "attachment problem" could be solved by some kind of semantic analysis, and
4. A grammar and vocabulary that provided broad coverage of the natural language (grammars are never complete and perfect) involved were used, and
5. All of the above could be done efficiently, then NLU systems would apparently be able to handle the literal meaning of natural language expressions (up to the sentence level) comprehensively and fairly well.

Additional problems would still remain in handling non-literal and ill-formed language, dealing with the integration of the meaning of multiple sentences, tracking discourse as mentioned above, etc. Nevertheless, achieving the performance goals implicit in the above hypothetical (and partly imaginative list) by other practical and realizable means would enable NLU systems to reach the described level of competence. These improvements would enable NLU to be applied in new ways and improve the performance and capabilities of existing commercial applications.

The inventions disclosed here address the problems corresponding to items 2, 3, and 5 above. A variant of predicate calculus is used instead of an alternative representation such as lambda calculus so that the resulting knowledge representations can be used more directly for inference and analysis.

Instead of lambda calculus, a version of predicate calculus is used that is more perspicuous than both lambda calculus and traditional versions of predicate calculus and has expressive power comparable to natural language with extensions that use frames or simple data structures to record aspects of meaning that predicate calculus is less well suited for, such as fuzzy terms, propositional attitudes, and tense.

The approach described here reduces the number of parse trees by providing mechanisms that permit the flattening of the grammar. For example, instead of using grammar rules such as
   np→[art, noun, pp]
   np→[noun]
   pp→[prep, np], where np stands for 'noun phrase', pp stands for 'prepositional phrase' and art stands for 'article', grammar rules such as
   series_postNomMods→[postNomMod, postNomMod, postNomMod] are used.

When the first set of grammar rules is applied to a sentence such as the classic example, "She saw the man on the hill with the telescope", multiple parse trees result depending on which modifiers (prepositional phrases) are interpreted as modifying 'man' or 'hill' and also depending on whether or not she used the telescope to see something or she saw the telescope. The point here is that even when information is available to disambiguate the various interpretations, all the parse trees need to be dealt with to either support the corresponding interpretation or reject it.

Using the approach involving the postNomMods category would still produce two parse trees, because the change in the grammar does not eliminate the alternative of whether or not she used or saw the telescope. Dependent clauses such as "that ran into the street" are treated as post-nominal modifiers (category postNomMod) also and can share the grammar rule with prepositional phrases.

The number of parse trees that must be constructed is further reduced by systematically removing nodes and "alternative child sets", defined below, of nodes from the chart prior to parse tree construction based on nodes that are found to have no interpretation. Any node for which no interpretation (no meaning) is found is removed from the chart. A record of node genesis (a record of which node creations and extensions lead to each node in the chart) is used to list all possible ordered sets of children for each node. This is called the list of alternative child sets for each node.

When a node, X, is removed from the chart, its list of alternative child sets is also removed. For each node, Y, distinct from X, in the chart and for each alternative child set, A, of Y that contains X, A is removed from the list of alternative child sets of Y. If the list of alternative child sets of a node becomes empty, that node is removed and this entire process is repeated, until no more alternative child sets or nodes can be removed from the chart. This process can be initiated during the bottom-up semantic composition step, described below, whenever a node is determined to have no interpretation.

For each grammar rule, there is a semantic composition rule that is used to compute all the alternative meaning representations (interpretations) of each node in the chart. Whenever any node is found to have no interpretations the approach for systematically removing nodes from the chart is used starting with the node initially found to have no interpretations. First the maximum depth of any possible parse tree is found. Each node in the chart has a feature that specifies its level. This is the level of that node in any parse tree in which it may appear. Nodes are simply examined to determine the deepest level of any node in the chart. Next all possible interpretations of each node at the maximum depth, which necessarily are leaves in any parse tree in which they appear, are calculated. Level 0 is the level of the roots of all possible parse trees that can in principle be constructed from the nodes of the chart. The following actions are then taken.

For each level, L, of nodes up to level 0:
   For each node, N, at level L:
     For each alternative child set, A, of N:
      For each combination of interpretations of A:
       Use the semantic composition rule of the grammar rule used to create N to calculate one new interpretation for node N, if possible.

The bottom-up semantic composition process yields a list of alternative interpretations for each node in the chart that has one or more interpretations. For each node its interpretations are computed from the interpretations of its children in each child set. One alternative child set can have multiple interpretations based on different combinations of interpretations of the nodes in that set.

If it were known in all cases which element of the right hand side of a grammar rule modified which other element of that right hand side, then any semantic composition that paralleled the construction of a parse tree could reliably represent the meaning of the entire input expression. This can be done at the expense of having a grammar that, in many cases, yields a troublesome increase in the number of parse trees. Also, it may be possible to apply other inventions disclosed herein to limit parse tree construction in other ways so that this increase in the number of parse trees presents little problem. Nevertheless, the approach that has been developed in sufficient detail to complete the first implementation uses the semantic composition step described in this section.

Before the final semantic composition step candidate modifier-modifiee pairs are collected during chart construction using travelling features. Also prior to this step bottom-up semantic composition is performed, which provides the alternative interpretations described in the preceding paragraph for each remaining node in the chart while removing nodes that cannot contribute as described above.

The final semantic composition step finds one modifiee for each modifier in cases where there is more than one candidate modifiee for any modifier such that all the relationships among entities referred to in the expressions involved are consistent with the senses of the predicating terms involved and consistent with additional predicates that are introduced from a general knowledge base as "explanations" for how each modifier modifies each modifiee. This analysis is performed for each series of modifiers separately. The node in the chart that corresponds to a series of modifiers may still be associated with a successful semantic analysis of that series of modifiers. If such a node corresponds to a series of modifiers with no acceptable interpretation, then that node itself has no interpretation and can be removed from the chart. In principle a parse tree corresponds to each interpretation of a series of such modifiers; however these parse trees never need to be constructed. Instead each interpretation of the series as a whole (one at a time) is attributed to the node in the chart that corresponds to that series (just the root of the parse trees never actually constructed). One condition must be met to attribute any interpretation to that node in the chart. There must be a modifiee for the series of modifiers as a whole that corresponds to a node actually present in the chart. The use of traveling features may provide the identity of candidate modifiees for the series of modifiers as it does in general for modifiers or another means may be used to identify the appropriate modifee.

The grammar rule for an "atomic" sentence is shown below. An atomic sentence is one that does not involve any numerical quantification, or nested or repeated quantification. An example atomic sentence is, "The time was estimated using a sundial." An atomic sentence can have any variety of complements of its main verb. The complements here are; 'The time' and 'a sundial'. Since this is a passive sentence the thematic role 'theme' corresponds to the subject of the sentence. This is indicated by the feature [role, [1], [theme]]. Here 'role' is the name of the feature. The middle element of the expression is [1].

In general, the middle element of such a feature specification is a list of integers that are 1-based indices to syntactic elements of the right hand side of the grammar rule and the integer 0 refers to the left hand side of the grammar rule. For features with the traditional interpretation this list of integers may specify which elements of the grammar rule must agree regarding the values of the named feature according to the standard criteria of unification. For travelling features, this list of integers may provide the "scope" of the values of the feature. For example, if value x of travelling feature A reaches the right hand side of a grammar rule because that value is passed up from a child node to a parent node corresponding to that grammar rule and value y of travelling feature B reaches the same right hand side of the parent node, then those values x and y "meet" at any elements of the right hand side of the parent that they have in common. The implication that the paths through potential parse trees in the chart meet is the useful information that this meeting of travelling feature values provides. When traveling features are used to find candidate modifiees for modifiers, knowing that a value from a modifier meets a value from a candidate modifiee implies that that modifiee is a candidate to be modified by that modifier. There are no travelling features in the grammar rule shown below.

As described herein, thematic roles are used to align arguments with argument places in a standard predicate under a particular sense of that predicate, where those arguments are the referents of complements of predicating terms such as verbs. In the example grammar rule, the [role, [4], [inst]] means that the fourth element of the right hand side of the grammar rule has the thematic role 'instrument'. [passive, [2], [yes]] specifies that for the second element of the right hand side, verbGroup, the value of the feature 'passive' must be 'yes', otherwise this grammar rule cannot apply. [tense, [0,2], all] specifies that the tense of the entire expression must be the same as the tense of the verbGroup. [ref, [1], [entity]] specifies that whatever expression corresponds to the first element of the right hand side, arg, it must refer to one or more entities of type entity. Since entity is the most general entry in the ontology, this is actually no restriction, which represents the general nature of this grammar rule. Every grammar rule has a unique identifying integer as shown by [rId, [0], [676]]. To help handle a variety of statements with nested quantification, atomic expressions that have no quantification above them in any parse tree in which they might appear may be treated differently from those with quantification above them. [topLev, [0], [yes]] indicates that any node in the chart to which this grammar rule applies has no quantification above it in any of those potential parse trees.

```
atomic--->[arg,verbGroup,using,arg].
   featStruc(atomic--->[arg,verbGroup,using,arg],
[[senseType,[2],[doing]],
 [rID,[0],[676]],
 [topLev,[0],[yes]],
 [negated,[0,2],all],
 [passive,[2],[yes]],
 [case,[1],[sub]],
 [mID,[0,2],[10]],
 [roleSeq,[0],[11]],
 [role,[4],[inst]],[ref,[4],[entity]],
 [case,[4],[none,obj]],
 [role,[1],[theme]],[ref,[1],[entity]],
 [tense,[0,2],all],[numPer,[1,2],[s1,s2,s3]]]).
```

Each thematic role can be a concept in the ontology or merely an indicator of linguistic structure. Theme and instrument are indicators of linguistic structure because any concept/entity can conceivably serve as the theme of a sentence and an instrument (something being used for something) can be any entity under the right circumstances. In contrast, agent may be required to be an entity capable of making decisions or taking deliberate actions. Humans and robots qualify as agents. The thematic role genAgent (generalized agent) is an indicator of linguistic usage in that sentences can be constructed to express an assertion in the same manner as in cases where an agent is involved, but where no action is taken, for example in the sentence 'The tire hit the rock' the linguistic structure parallels that of the sentence 'The man hit the rock', where it is ambiguous whether the man took an action or not. He may have merely fallen on the rock. Additional conventions can be specified when both agent and genAgent would otherwise apply to choose between them. In this case one can specify that if the agent/genAgent is an animate entity that the thematic role used be agent. This avoids more complex considerations such as whether an animate entity has sufficient intelligence or opportunity to carry out some particular action in a deliberate or accidental manner, or whether or not a particular action can plausibly be accidental.

Specific specifications of thematic roles are tentative and subject to revision. The point is that they be selected whenever possible to impose real ontological restrictions and when this is not possible that they be specified (as seems to be the case broadly among researchers who have no universal consensus regarding thematic roles) to capture generalizations in linguist usage and structure. Some academics argue that thematic roles should be dispensed with altogether. As mentioned above the use described here is primarily as a tool to standardize knowledge representation, but another goal is to connect, when possible, the entities referred to by the complements of verbs with concepts in the ontology.

Additional type restrictions come from the sense of the predicating terms, including verbs, in combination with any type restrictions on that argument for each particular sense of the predicating term. These type restrictions are not necessarily specifications of single types in the ontology. They can be any Boolean combination of types and can be represented in disjunctive normal form for uniformity.

A standard "master" sequence of thematic roles is specified for each verb sense. This sequence contains all the thematic roles that could ever conceivably be expressed for that verb sense. No matter which thematic roles correspond to complements of an input expression that are actually expressed, the respective predicate arguments of expressed complements are placed in the argument place corresponding to the location of their thematic role in the master sequence. Argument places in the predicate for which no complement is expressed are filled with the symbol 'ne', which stands for "not expressed".

Each natural language grammar rule has an attribute that specifies which master sequence applies. It also has an attribute that specifies which thematic role sequence (in many cases distinct from the master sequence) is used in the expression of the sentence. This second thematic role sequence contains only thematic roles that are expressed in the sentence, based on which complements are present in the grammar rule itself. In the grammar rule shown above the only thematic roles that the grammar rule specifies complements for are instrument and theme. Consequently, thematic role sequence 11, which is used in that grammar rule, contains only those thematic roles. If individual thematic roles were specified as features for all grammar rules, as in the grammar rule shown, one could omit the use of a feature to specify the use of thematic role sequence 11 and "extract" the sequence from the grammar rule itself; however this would reflect one (perhaps less efficient variation) of many variations on the method of using thematic role sequences to standardize argument order in the KRL. Other systems use "verb frames" to characterize verbs with similar behavior. The approach disclosed here is intended to support a finer grained analysis sufficient so that zero tolerance or near zero tolerance can apply to generalizations of properly constrained grammar rules. It is anticipated that for commercial applications there will be a larger number of grammar rules due to this fine grained analysis, many of them similar to one another, but that it will be easier to collect them systematically using machine learning or by other means.

The bottom-up semantic composition, the modifier-target identification process and other procedures in the system use the thematic role sequences to reorder predicate arguments as needed to construct a standard representation of the meaning of predicating expressions.

The practical goals in using thematic roles are to standardize the order of arguments of predicates in the KRL, opportunistically reflect linguistic generalizations, and connect the arguments of predicates to the ontology thus restricting the instantiations of those predicates appropriately under the sense of the predicating term with which each thematic role sequence is associated.

Disclosed herein are a method for analyzing the meaning of each consecutive series of modifiers, a new type of features called "traveling features" for use with grammar rules that is used to support that method for analyzing consecutive series of modifiers, and a method for standardizing the sequence of arguments in logical predicates so that different natural language expressions that are interpreted by an NLU system as having the same meaning and whose meaning is each represented by an atomic logical formula end up having identical representations of their meanings. Also disclosed are methods for ensuring an interpretation of natural language expressions corresponding to atomic logical formulas that takes into account the senses of words (both those that are predicating words, such as verbs, and words that refer to entities rather than introducing predication) and that takes into account the types of concepts to which words and expressions can refer and that takes into account the types of entities that can correspond to the arguments in predicates. The methods that take into account these last several items are an integral part of the method that standardizes the order of arguments in atomic logical formulas.

The presently disclosed invention is now described in more detail. For example, FIG. 1 illustrates a block diagram of a system 100 according to embodiments of the present invention. The system 100 may be implemented in whole or in part in any suitable computing environment. A computing device 102 may be communicatively connected via a communications network 104, which may be any suitable local area network (LAN), either wireless (e.g., BLUETOOTH® communication technology) and/or wired. The computing device 102, a tablet device 106 in communication with the computing device 102, and other components, not shown, may be configured to acquire data within the retail environment, to process the data, and to communicate the data to a centralized server 108. For example, the computing device 102 and tablet device 106 may operate together to implement a retail function and to communicate data related thereto to the server 108. The server 108 may reside in the retail store or be remotely located.

The components of the system 100 may each include hardware, software, firmware, or combinations thereof. For example, software residing in memory of a respective component may include instructions implemented by a processor for carrying out functions disclosed herein. As an example, the computing device 102 may each include a user interface 110 including a display (e.g., a touchscreen display), a barcode scanner, and/or other equipment for interfacing with medical personnel and for conducting diagnostic analysis. The computing device 102 may also include memory 112. The computing device 102 may also include a suitable network interface 114 for communicating with the network 104. The tablet device 106 may include hardware (e.g., image capture devices, scanners, and the like) for capture of various data within the computing environment. The system 100 may also include a smart phone device configured similarly to the tablet device 106. The system 100 may also comprise a database 118 for storage of grammatical rules, word and phrase definitions and meanings, as an example. Further, the server 108 may be connected to the computing devices 102 via the network 104 or via a wireless network 120.

In continuing reference to FIG. 1, the system 100 comprising at least a processor and memory of a computing device and a natural language parser 122 is provided. As will be described in further detail in FIGS. 2-4 the natural language parser 122 is configured to parse natural language predicating expressions into artificial language predicating expressions. Further, the natural language parser 122 is configured to store the parsed natural language predicating expression and the artificial language predicating expression in the database 118. The database 118 may also be used to store rules and/or instructions associated with the parsing of the natural language predicating expression. It should be noted that the database 118 may be located either internal or external to the servers 108.

Figure 2:
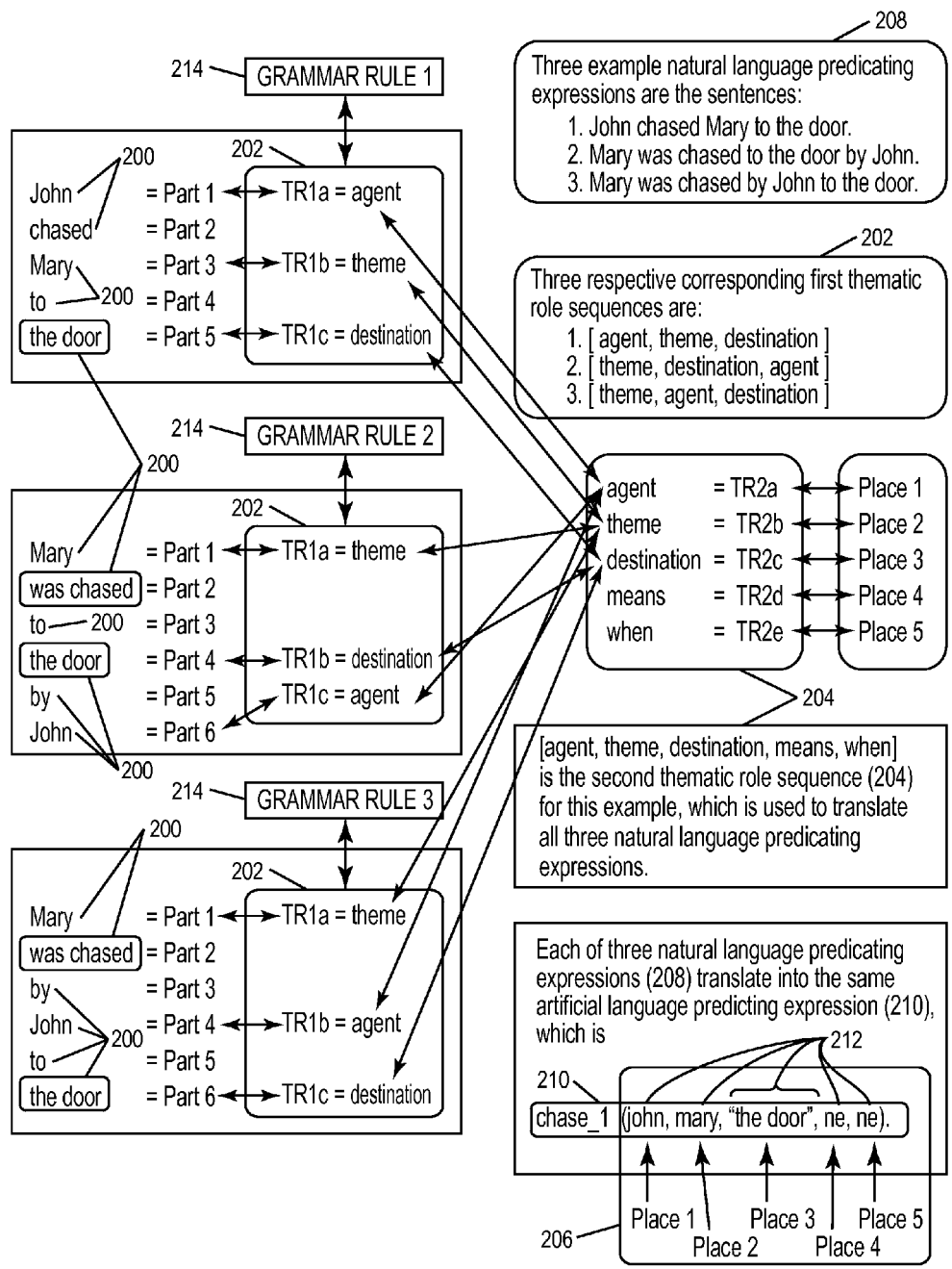
FIG. 2 is a block diagram showing the process of argument ordering of natural language predicating expressions with thematic role sequences according to embodiments of the present invention.

FIG. 2 is a block diagram showing an exemplary mapping among a plurality of natural language predicating expression parts 200, first thematic role sequence elements of a plurality of first thematic role sequences 202, second thematic role sequence elements of one second thematic role sequence 204, and artificial language predicating expression argument places 206 that may be used to translate each of the three natural language predicating expressions 208 into the same artificial language predicating expression 210. In this non-limiting example, the plurality of first thematic role sequences 202 comprises three (3) first thematic role sequences 202. Each first thematic role sequence of the plurality of first thematic role sequences is shown in FIG. 2 with a corresponding grammar rule, 214.

The exemplary mapping shown in FIG. 2 discloses the exemplary method used to translate each of the three natural language predicating expressions 208 into the same artificial language predicating expression 210. In the exemplary method, one of the three first thematic role sequences 202 is used for each of the example three natural language predicating expressions 208 and the same one second thematic role sequence 204 may be used once for each of the three natural language predicating expressions 208. The result of applying any one of the three first thematic role sequences 202 and the one second thematic role sequence 204 is to determine a sequence of artificial language predicating expression arguments 212 in the artificial language predicating expression 210, wherein the sequence of artificial language predicating expression arguments 212 is the same no matter which one of the first thematic role sequences 202 is applied.

In continuing reference to FIG. 2, each of the three natural language predicating expressions 208 are shown as comprising a first corresponding subset of the plurality of natural language predicating expression parts 200. Each one of the plurality of natural language predicating expression parts 200 comprises at least one token. Examples of tokens may include words and punctuation marks.

In continuing reference to FIG. 2, the exemplary artificial language predicating expression 210 partially comprises the sequence of the artificial language predicating expression arguments 212. Two of the exemplary artificial language predicating expression arguments are each the symbol "ne". The symbol "ne" stands for "not expressed," this indicates that for each "ne" there is no natural language predicating expression part 200 corresponding to the argument place 206 occupied by the "ne." Each one of the artificial language predicating expression arguments 212, other than the artificial language predicating expression arguments that are each "ne," is a data structure. Each one of the artificial language predicating expression arguments 212 specify at least a partial meaning of at least one of the plurality of natural language predicating expression parts 200. The at least one of the plurality of natural language predicating expression parts 200 corresponds to one of the artificial language predicating expression argument places 206 to which the data structure is assigned in accordance with the exemplary correspondences shown in FIG. 2. Each one of the data structures may be an artificial language predicating expression argument 212 by virtue of being assigned to the one of the artificial language predicating expression argument places 206.

Figure 3:
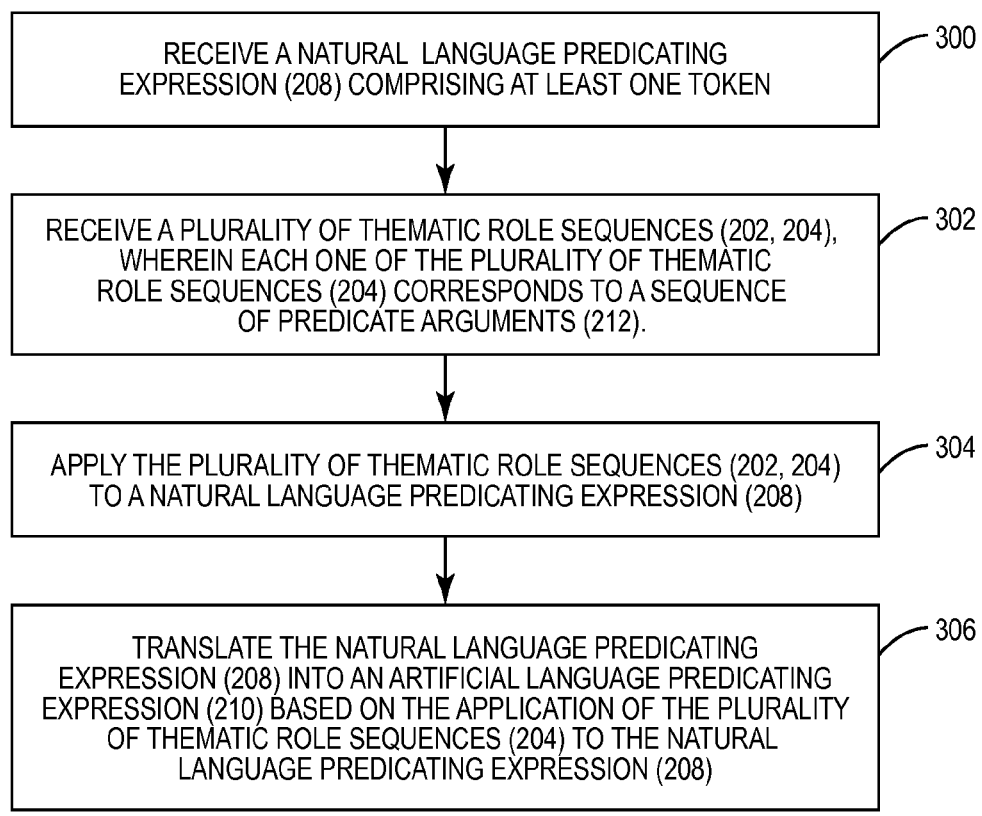
FIG. 3 is a flowchart showing the receiving of a natural language predicating expression, the applying of a plurality of thematic role sequences and translating the natural language predicating expression into an artificial language predicating expression according to embodiments of the present invention.

FIG. 3 is a flowchart of an exemplary method of using a plurality of thematic role sequences 202 204 to translate a natural language predicating expression 208 into an artificial language predicating expression 210 exemplified by the artificial language predicating expression 210. Block 300 of FIG. 3 is the step of receiving a natural language predicating expression 208 comprising at least one token. Tokens may include words and punctuation marks. An example of a natural language predicating expression 208 comprising one token is a command such as "Go", wherein the single artificial language predicating expression argument corresponds to a thematic role named "agent" and wherein the meaning of the artificial language predicating expression argument is the person or persons to whom the command is spoken. An artificial language predicating expression argument that does not correspond to any first thematic role sequence 202 element may be assigned to an artificial language predicating expression argument place 206, wherein the artificial language predicating expression argument place 206 corresponds to a thematic role and wherein the thematic role is specified separately from the specification of any first thematic role sequence 202. In block 302 is the step of receiving a plurality of thematic role sequences 202 204, wherein each one of the plurality of thematic role sequences 204 corresponds to a sequence of predicate arguments 212. Next the method applies the plurality of thematic role sequences 202 204 to a natural language predicating expression 208 (block 304). Finally, the method translates the natural language predicating expression 208 into an artificial language predicating expression 210 based on the application of the plurality of thematic role sequences 204 to the natural language predicating expression 208 (block 306).

Figure 4:
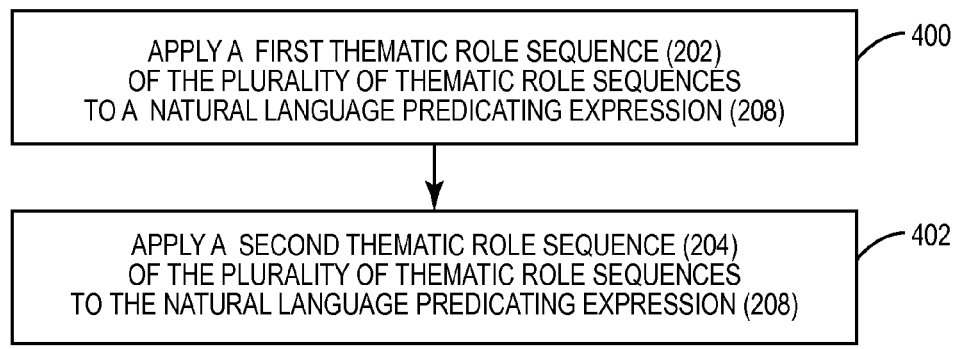
FIG. 4 is a flowchart showing the applying of a plurality of thematic role sequences according to embodiments of the present invention.

FIG. 4 is a flowchart of an exemplary method of applying the first thematic role sequence 202 of a plurality of thematic role sequences 202 204 to a natural language predicating expression 208 (block 400). Additionally, the method applies the second thematic role sequence 204 of the plurality of thematic role sequences 202 204 to translate the natural language predicating expression 208 into an artificial language predicating expression 210 (block 402)

Figure 5:
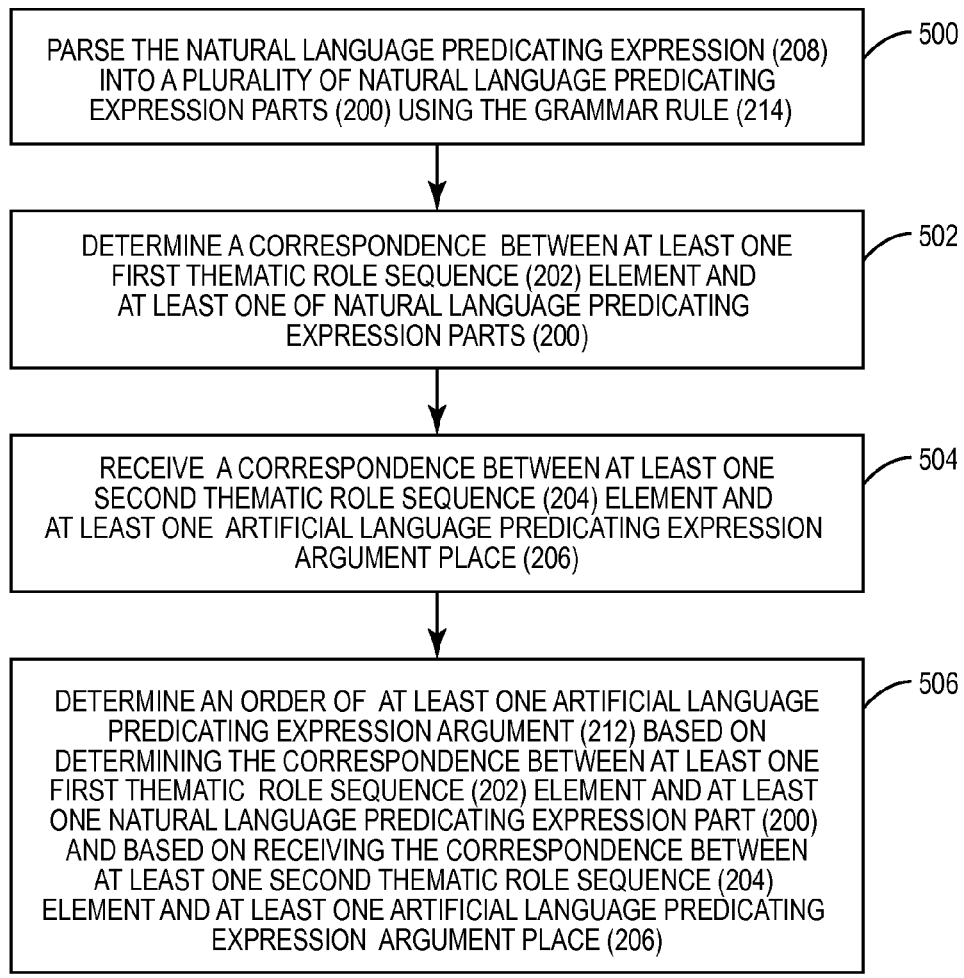
FIG. 5 is a flowchart showing the parsing of the natural language predicating expression into a plurality of parts and determining an order of an artificial language predicating expression according to embodiments of the present invention.

In regard to FIG. 5 is a flowchart of an exemplary method of parsing the natural language predicating expression 208 into a plurality of natural language predicating expression parts 200 using a grammar rule 214 (block 500). The method then determines a correspondence between at least one first thematic role sequence 202 element and at least one of the natural language predicating expression parts 200 (block 502). Next in block 504, the method receives a correspondence between at least one second thematic role sequence 204 element and at least one artificial language predicating expression argument place 206. Finally, in block 506, the method determines an order of at least one artificial language predicating expression argument 212 based on determining the correspondence between at least one first thematic role sequence 202 element and at least one of the natural language predicating expression part 200 and based on receiving the correspondence between at least one second thematic role sequence 204 element and at least one artificial language predicating expression argument place 206.

In continuing reference to FIG. 5, a first data structure representing at least a partial meaning for each one of at least one of the natural language predicating expression parts 200 may be received. One such received first data structure may correspond to a thematic role that is an element of a first thematic role sequence 202. In this case, a mapping exemplified by the mapping shown in FIG. 2 may be used to determine the artificial language predicating expression argument place 206 to which the one such received first data structure is assigned. In block 506, the method determines an order of at least one artificial language predicating expression argument 212. In the example just described, in which a received first data structure corresponds to a thematic role that is an element of a first thematic role sequence 202 that received first data structure, is the artificial language predicating expression argument 212 assigned to the determined artificial language predicating expression argument place 206.

In an example where a received first data structure representing at least a partial meaning for each one of at least one of the natural language predicating expression parts 200 does not correspond to a thematic role that is an element of any first thematic role sequence 202, a second data structure may be received representing at least a partial meaning for each one of at least one of the natural language predicating expression parts 200 and a specification of the identity of an element of a second thematic role sequence 204 may be received that corresponds to that second data structure. In this example the second data structure may be assigned to the corresponding artificial language predicating expression argument place 206 without using the entire mapping exemplified in FIG. 2.

Figure 6A:
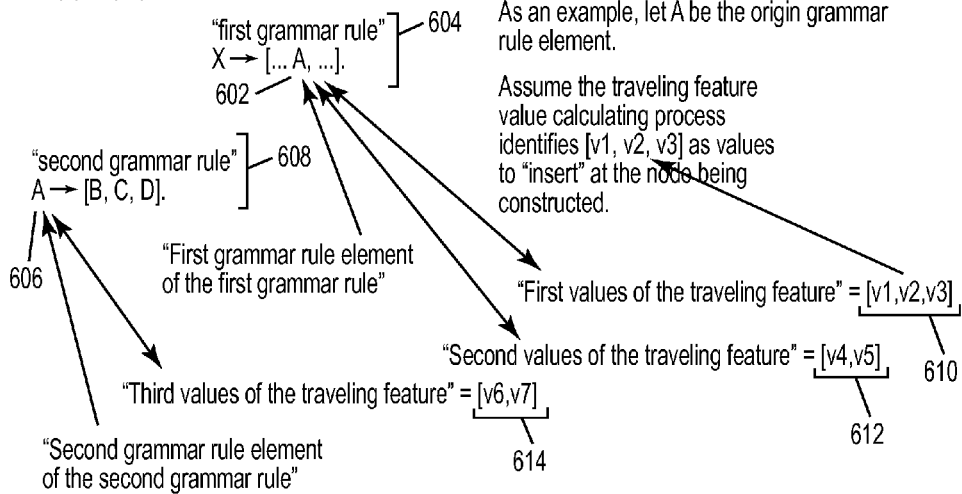
FIG. 6A is a conceptual diagram showing the relationship of grammar rules and traveling feature values according to embodiments of the present invention.
Figure 6B:
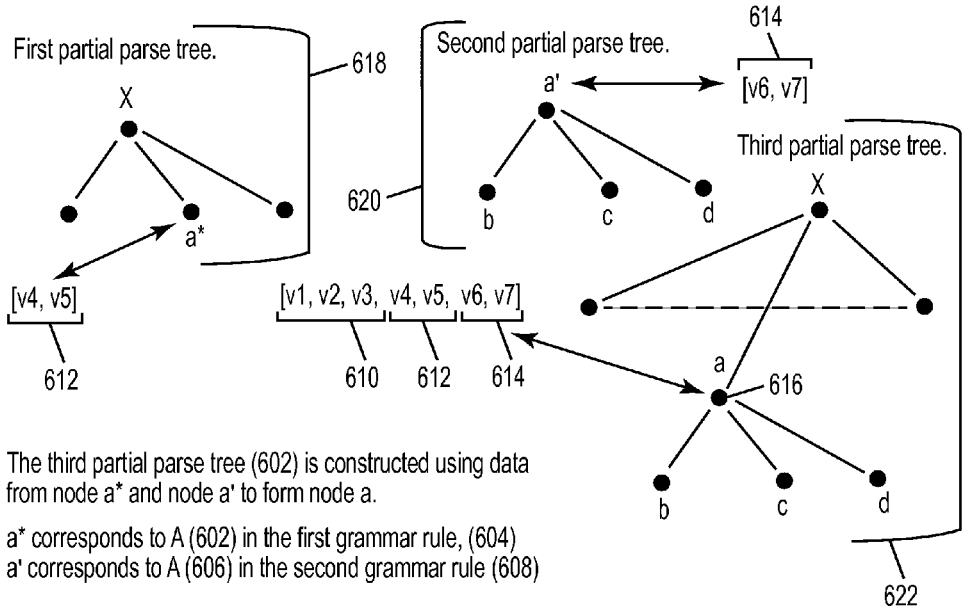
FIG. 6B is a conceptual diagram showing the relationship connecting two partial parse trees to form a third partial parse tree according to embodiments of the present invention.

FIG. 6 comprises two (2) figures, FIG. 6A and FIG. 6B. FIG. 6A shows exemplary correspondences among one of the at least one first grammar rule element 602 of a first grammar rule 604 where the first grammar rule element 602 is identified as an exemplary origin of a traveling feature. In addition, FIG. 6A shows exemplary correspondences between the foregoing and one at least one second grammar rule element 606 of a second grammar rule 608, identified first values 610 of the traveling feature, received identified existing second values of the traveling feature 612 associated with the one at least one first grammar rule element 602, and received identified existing third values of the traveling feature 614 associated with the one at least one second grammar rule element 606.

FIG. 6B shows an exemplary step of constructing a first node 616 based on the application of the traveling feature value calculating process. FIG. 6B further exemplifies associating the determined identified first values 610 of the traveling feature, the determined identified second values 612 of the traveling feature and the determined identified third values 614 of the traveling feature with the first constructed node 616. As shown in FIG. 6B, the values of each respective "list" of values 610 612 614 associated with the first node are the entire list, in contrast to any determined subset of the respective list that does not contain all the values of the list.

FIG. 6B shows an exemplary context that may exist for the step taken of constructing the first node 616 and the respective steps of associating the determined identified first values 610 of the traveling feature, the determined identified second values 612 of the traveling feature and the determined identified third values 614 of the traveling feature with the first node 616. This exemplary context may exist in a situation wherein a chart of a chart parser is being constructed. In such a context, a first partial parse tree 618 may correspond to a first edge associated with the chart being constructed, a second partial parse tree 620 may correspond to a second edge associated with the chart being constructed, and a third partial parse tree 622 may result from the combination of the first partial parse tree 618 and the second partial parse tree 620. The resulting third partial parse tree 622 may be associated with a newly constructed edge associated with the chart of a chart parser. In the exemplary context, shown in FIG. 6B, the constructed first node 616 is placed in the resulting third partial parse tree 622 at the location at which the first partial parse tree 618 and the second partial parse tree 620 are joined. At least one node may be associated with each element of the first grammar rule 604 and with each element of the second grammar rule 608. In the example shown, the first values 610 and the second values 612 are associated with node a* because the first grammar rule element 602 corresponds to a*. In the example shown, the third values 614 are associated with node a' because the second grammar rule element 606.

Figure 7:
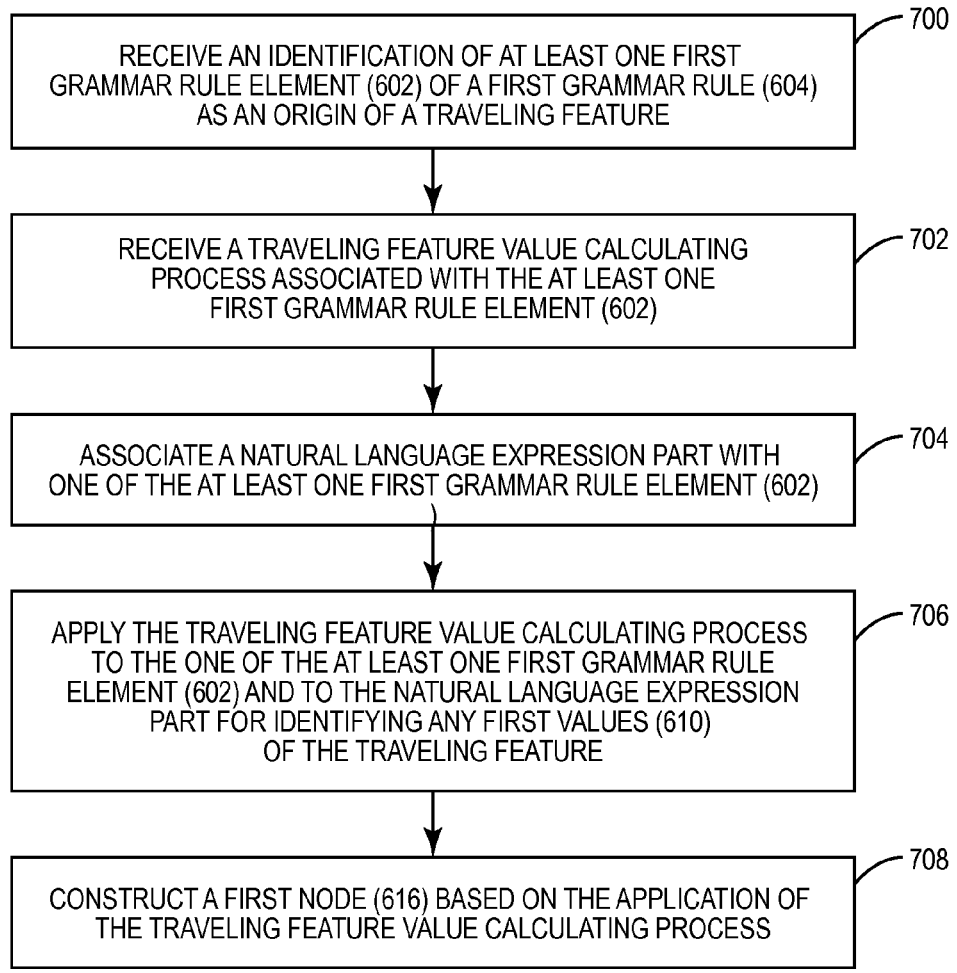
FIG. 7 is flowchart showing the receiving of an identification of at least one grammar rule and receiving a traveling feature calculating process, then applying the traveling feature value calculating process to the grammar rule according to embodiments of the present invention.

FIG. 7 is a flow chart of an exemplary method of constructing a first node 616 based on applying a received feature value calculating process to one of the identified at least one first grammar rule element 602 and to an associated natural language expression part for identifying any first values 610 of a traveling feature, where an identification of the at least one first grammar rule element 602 as an origin of the traveling feature is received.

An identification of at least one first grammar rule element 602 of a first grammar rule 604 as an origin of a traveling feature is received (block 700). A traveling feature value calculating process associated with the at least one first grammar rule element 602 is received (block 702). Any of the elements of the first grammar rule may be identified as respective origins of the traveling feature. Each such identified origin of the traveling feature may have a distinct associated traveling feature value calculating process. In examples where there are multiple elements of the first grammar rule 602 identified as respective origins of the traveling feature, the first values 610 of the traveling feature identified by the application of the multiple respective traveling feature value calculating processes may be accumulated and associated with additional elements of associated grammar rules.

A natural language expression part is associated with one of the at least one first grammar rule element 602 (block 704). Any traveling feature value calculating process may use the associated natural language expression part in any manner as an input to that calculating process. The traveling feature value calculating process is applied to the one of the at least one first grammar rule element 602 and to the natural language expression part for identifying any first values 610 of the traveling feature (block 706).

The first node 616 is constructed based on the application of the traveling feature value calculating process (block 708). The resulting traveling feature values, if any, may be associated with the constructed first node 616 in any manner. In some cases, it may be useful to merely associate any accumulated traveling feature values with additional elements of grammar rules in a manner that results in their appearing at desired locations within parse trees, where those parse trees result from any appropriate process.

Figure 8:
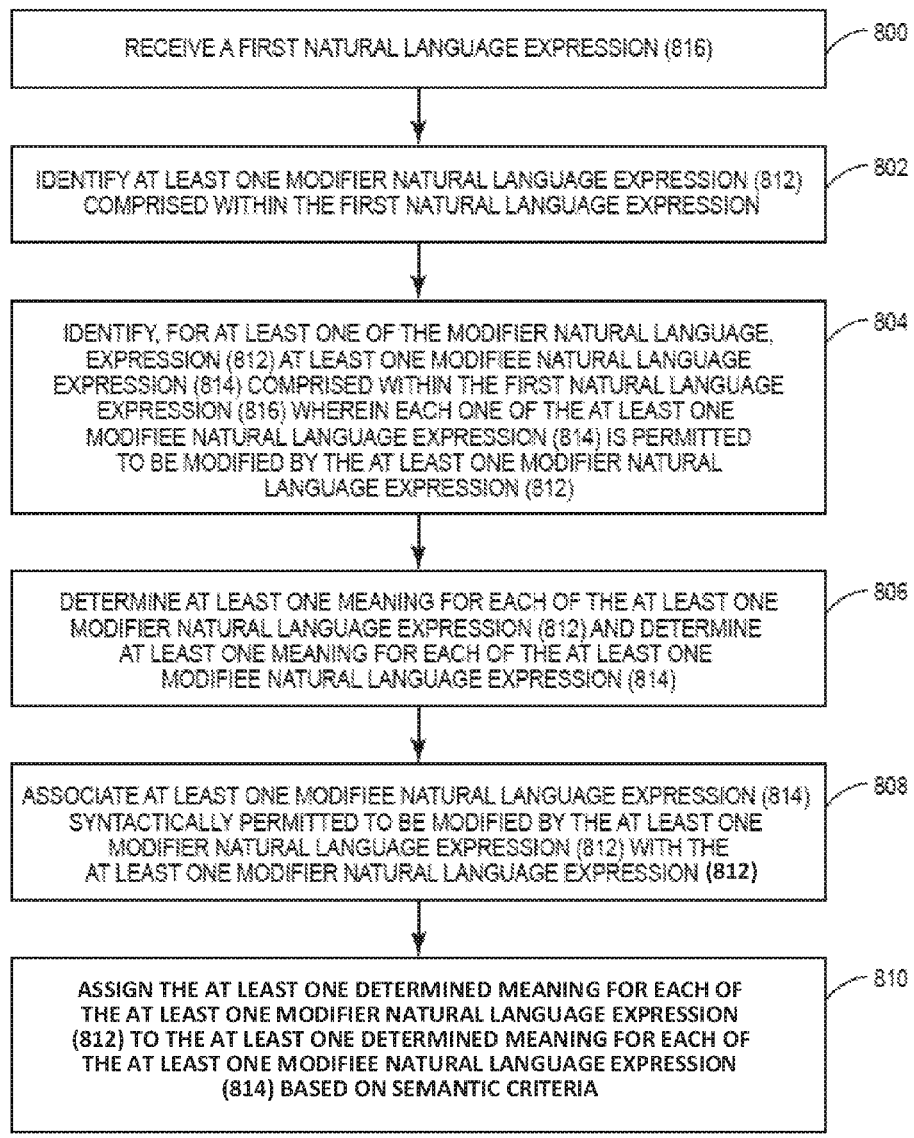
FIG. 8 is a flowchart showing the receiving of a natural language expression and assigning a meaning based on semantic criteria according to embodiments of the present invention.

FIG. 8 is a flowchart of an exemplary method comprising steps leading to the assignment of an at least one determined meaning for each of the at least one modifier natural language expression 812 to an at least one determined meaning for each of an at least one modifiee natural language expression 814. The assignment of the determined meanings occur where both the at least one determined meaning for each of the at least one modifier natural language expression 812 and the at least one modifiee natural language expression 814 are comprised within a received first natural language expression 816.

A first natural language expression 816 is received (block 800). The first natural language expression 816 is the natural language expression whose meaning is at least partly being determined by assigning at least one determined meaning for each of the at least one modifier natural language expression 812 to the at least one determined meaning for each of an at least one modifiee natural language expression 814.

At least one modifier natural language expression 812 comprised within a received natural language expression, is identified (block 802). For at least one of the modifier natural language expression 812 the natural language parser identifies at least one modifiee natural language expression 814 comprised within the first natural language expression 816 wherein each one of the at least one modifiee natural language expressions 814 is permitted to be modified by the at least one modifier natural language expressions 812 (block 804). This step may be used to identify at least one modifiee natural language expression 814 that may be permitted to modify the at least one of the modifier natural language expression 812 under any initial criteria.

At least one meaning for each of the at least one modifier natural language expression 812 is determined and at least one meaning for each of the at least one modifiee natural language expression 814 is determined (block 806).

At least one modifiee natural language expression 814 syntactically permitted to be modified by the at least one modifier natural language expression 812 is associated with the at least one modifier natural language expression 812 (block 808). This step may essentially reflect a selection of at least one modifiee natural language expression 814 that may be modified by the at least one modifier natural language expression 812 based on syntactic criteria.

With continued reference to FIG. 8, the at least one determined meaning for each of the at least one modifier natural language expression 812 is assigned to the at least one determined meaning for each of the at least one modifiee natural language expression 814 based on semantic criteria (block 810). The combination of the last two steps (blocks 808 810), may associate at least one modifier natural language expression 812 with at least one assigned determined meaning with at least one modifiee natural language expression 814 also with at least one assigned determined meaning. Since this association is made for each of the at least one modifier natural language expression 812 a partial interpretation of the received first natural language expression 816 as a whole is reflected, although additional factors may contribute to any overall interpretation of the first received natural language expression.

Figure 9:
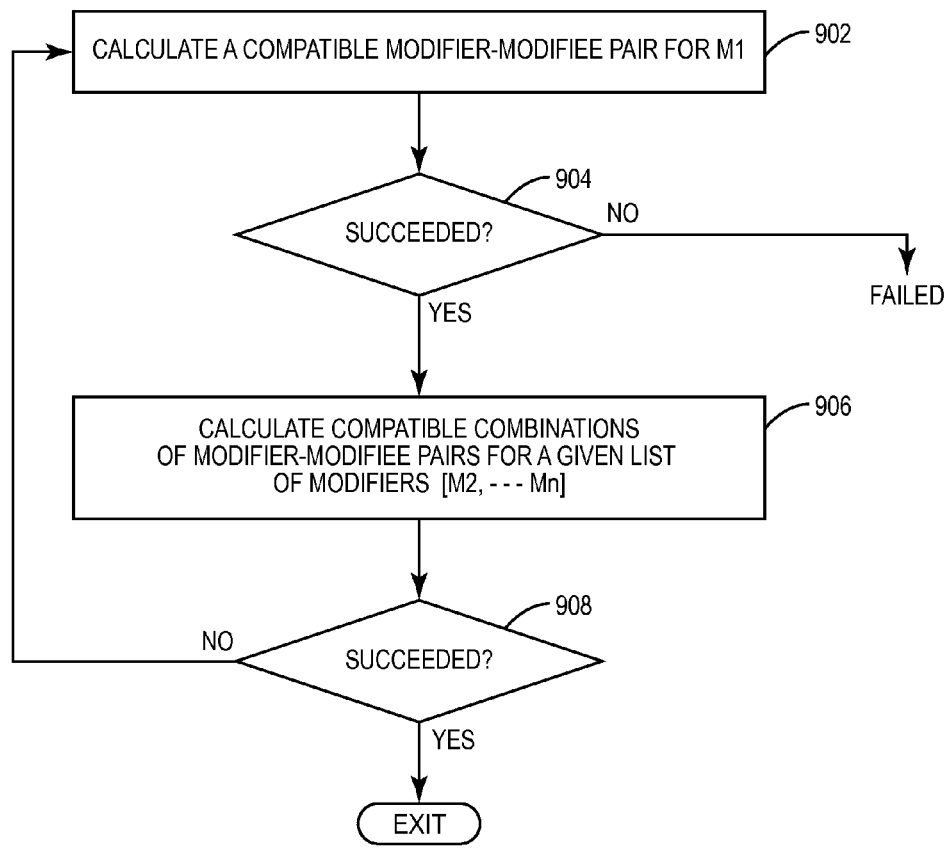
FIG. 9 is a flowchart showing steps of a recursive procedure that finds acceptable combinations of modifier-modifiee pairs, such that for each pair, [X,Y], respective senses for X and Y, Xs and Ys, and a representation that reflects how X with sense Xs can modify Y with sense Ys are specified according to embodiments of the present invention.

FIG. 9 is a flow chart that exemplifies a method of associating the at least one modifiee natural language expression 814 syntactically permitted to be modified by the at least one modifier natural language expression 812 with the at least one modifier natural language expression 812 (block 808) of FIG. 8 and of assigning the at least one determined meaning for each of the at least one modifier natural language expression 812 to the at least one determined meaning for each of the at least one modifiee natural language expression 814 based on semantic criteria (block 810) of FIG. 8.

Figure 10:
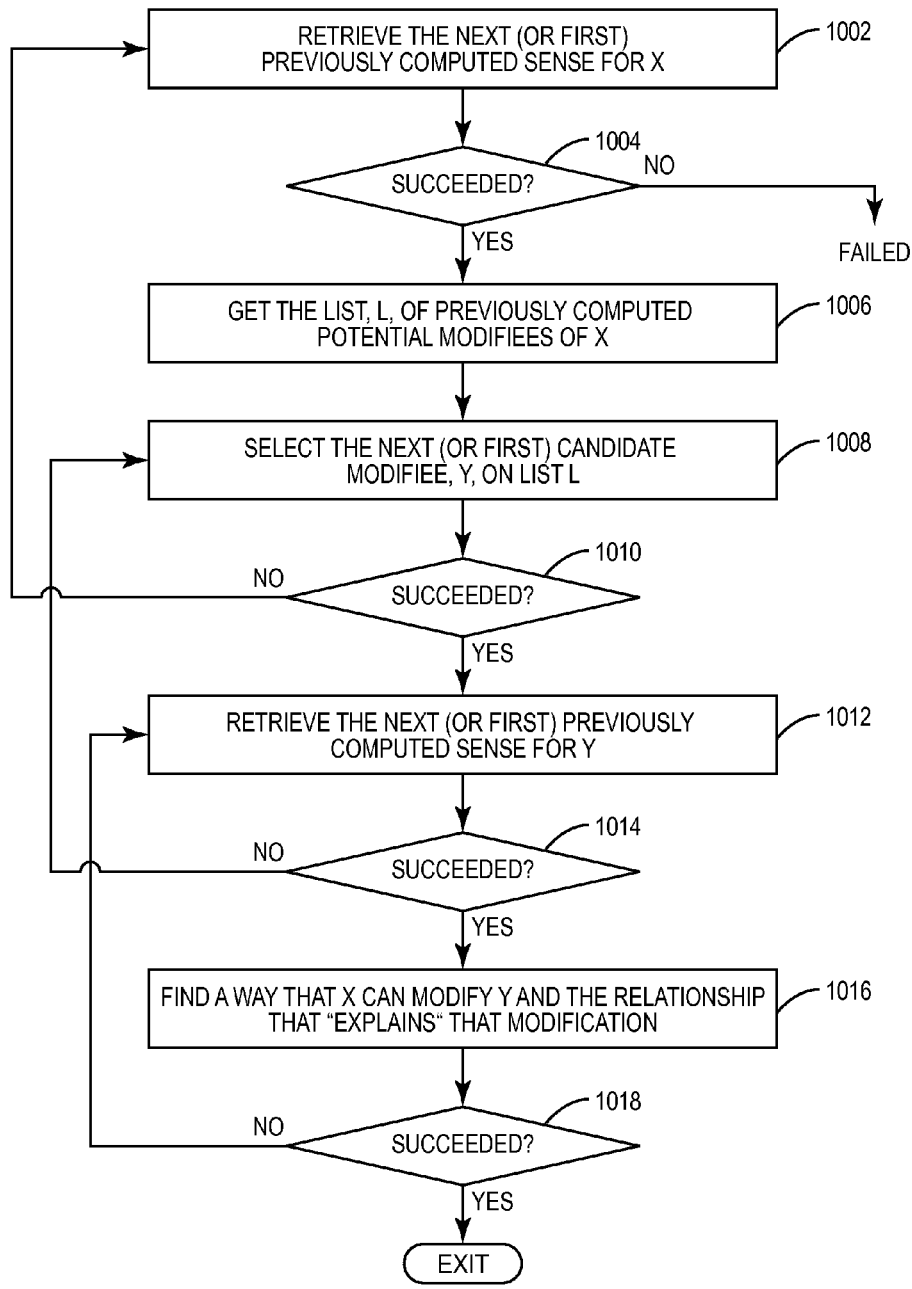
FIG. 10 is a flowchart showing a process that on each call calculates a combination of a meaning for a given modifier X, a modifiee, Y, that is paired with X, respective meanings for X and Y, Xs and Ys, and a representation that reflects how X with meaning Xs can modify Y with meaning Ys according to embodiments of the present invention.

FIG. 9 is a flow chart for one of two exemplary methods that may correspond to two respective procedures, one which partially comprises or calls the other. The method of FIG. 9 comprises the method shown in FIG. 10. FIG. 9 and FIG. 10 may apply to an exemplary case where only one modifiee natural language expression 814 is associated with each modifier natural language expression 812.

FIG. 9 reflects the assumption that for each of at least one of the modifier natural language expression 812 at least one modifiee natural language expression 814 comprised within the first natural language expression 816, wherein each one of the at least one modifiee natural language expression 814 is permitted to be modified by the at least one modifier natural language expression 812. In other words, FIG. 10 reflects the assumption that the step of (block 804) of FIG. 8 has already been taken for the exemplary case of FIG. 9 and FIG. 10. FIG. 9 also reflects the assumption that the step of (block 806) of FIG. 8 has been taken for the exemplary case of FIG. 9 and FIG. 10. Consequently one or more meanings are assumed to have already been determined for the identified modifiers and for the identified modifiees comprised within a first natural language expression 816.

Block 902 of FIG. 9 discloses the step of associating at least one modifiee natural language expression 814 syntactically permitted to be modified by the at least one modifier natural language expression 812 with the at least one modifier natural language expression 814 for the exemplary case of FIG. 9 and FIG. 10. Block 902 of FIG. 9 also discloses the step of assigning the at least one determined meaning for each of the at least one modifier natural language expression 812 to the at least one determined meaning for each of the at least one modifiee natural language expression 814 based on semantic criteria for the exemplary case of FIG. 9 and FIG. 10.

For the exemplary case of FIG. 9 and FIG. 10, block 902 corresponds to steps of block 808 and block 810 of FIG. 8, where one modifiee is associated with one modifier, and at least one determined meaning of the modifier natural language expression 812 is assigned to at least one determined meaning of the modifiee natural language expression 814. Block 902 also corresponds to the step of the exemplified method of FIG. 9 that is elaborated in FIG. 10 for the exemplary case of FIG. 9 and FIG. 10.

The conditional branch 904 tests for a failure of the method at the current level of recursion if no compatible modifier-modifiee pair is found for the first modifier (for the current level of recursion) on a list containing all the modifier natural language expressions 812 found at block 802 of FIG. 8.

The step of block 906 discloses a self-recursive call to the exemplary procedure reflected in FIG. 9, where that call attempts to find compatible modifier-modifiee pairs for all but the first (for the current level of recursion) modifier natural language expression 812. If conditional branch 908 fails, then the method of FIG. 9 attempts to find an alternative compatible modifier-modifiee pair for the first modifier natural language expression 812.

FIG. 10 is a flowchart of an exemplary method of associating at least one modifiee natural language expression 814 syntactically permitted to be modified by the at least one modifier natural language expression 812 with the at least one modifier natural language expression 812 for the exemplary case of FIG. 9 and FIG. 10. The flowchart of FIG. 10 also discloses the step of assigning the at least one determined meaning for each of the at least one modifier natural language expression 812 to the at least one determined meaning for each of the at least one modifiee natural language expression 814 based on semantic criteria for the exemplary case of FIG. 9 and FIG. 10.

Step 1002 attempts to retrieve a representation of a meaning for a modifier natural language expression 812. If step 1002 succeeds according to conditional branch 1004, then step 1006 retrieves a list of all the modifiee natural language expressions 814 that are permitted to be modified by a modifier natural language expression 812 that are identified in step 804 of FIG. 8.

Step 1008 selects the next or first element, a modifiee natural language expression, 814 from the list of modifiees retrieved in step 1006. Step 1008 succeeds as determined by conditional branch 1010 unless the list retrieved in step 1006 is empty. If the retrieved list is empty then the method backtracks to try an alternative meaning representation of the modifier natural language expression, 812.

Step 1012 retrieves a meaning representation for the modifiee natural language expression 814 selected from a list in step 1006. If the retrieval succeeds as determined by the conditional branch 1014, then an attempt is made at step 1016 to find a way that the currently selected modifier natural language expression 812 can modify the currently selected modifier natural language expression 814. Essentially, some relationship is postulated between the modifier natural language expression 812 and the modifiee natural language expression 814 that "explains" how the former can modify the later.

If no relationship is successfully postulated at step 1016, as determined at conditional branch 1018, then the method backtracks to step 1012 to retrieve a next meaning representation for modifiee natural language expression 814. The exemplary method reflected by FIG. 9 and FIG. 10 terminates successfully, as determined by conditional branch 1018, when all modifier natural language expressions 812 have an associated modifiee natural language expression 814 as disclosed more broadly in step 808 of FIG. 8, and at least one meaning representation (at least one determined meaning) for each modifier natural language expressions 812 is assigned to at least one respective meaning representation (at least one determined meaning), of the associated modifiee natural language expression 814 as reflected more broadly in step 810 of FIG. 8.

Figure 11:
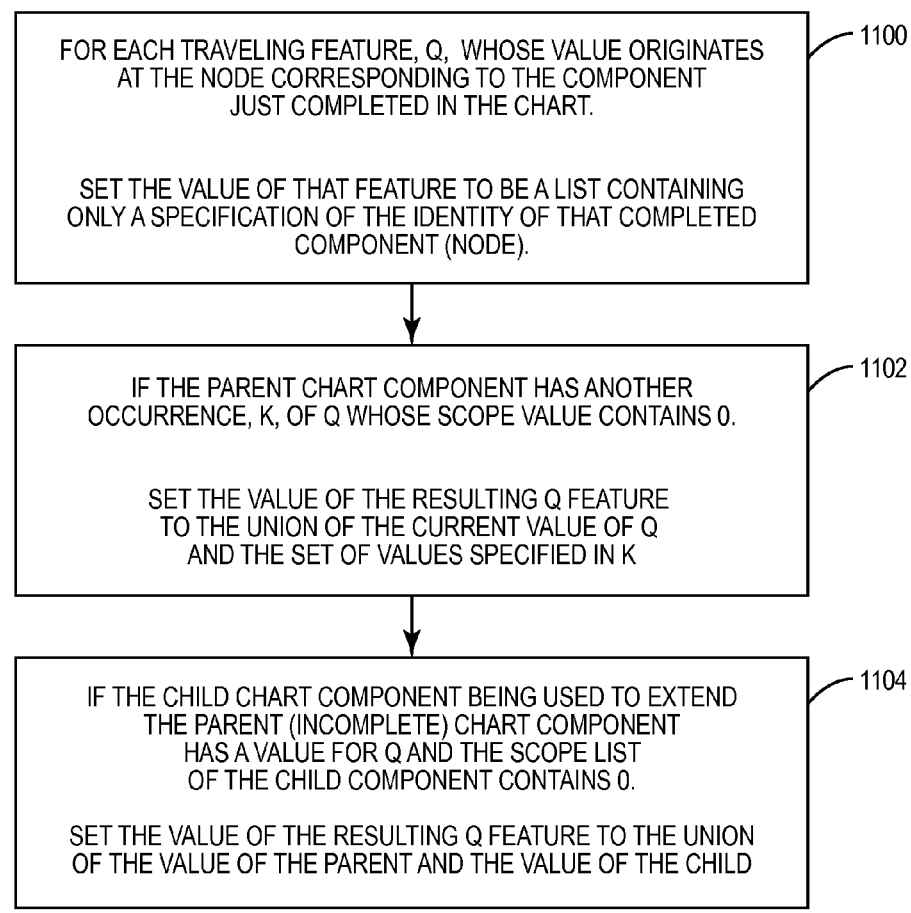
FIG. 11 is a flowchart showing the process to originate values for traveling attributes based on notation in grammar rules and to combine the values of traveling attributes of a "parent" node being extended during chart construction with the appropriate values of traveling attributes of the child node that is being used to extend the parent node according to embodiments of the present invention.

FIG. 11 is a flow chart that exemplifies the method of constructing a first node 616. The construction of the first node 616 is based on applying a received feature value calculating process to one of the identified at least one second grammar rule elements 606 for FIG. 11. The construction of the first node 616 is also based on an associated natural language expression part for identifying any first values 610 of a traveling feature, where an identification of the at least one second grammar rule element 606 for FIG. 11, as an origin of the traveling feature is received. This differs from the example shown in FIG. 6, because the child node, (a' in FIG. 6) corresponds to the grammar rule element 606 that is identified as an origin of the traveling feature for the example shown in FIG. 11.

For the example disclosed in FIG. 11 each traveling feature is being used to handle information about implicit paths from node to node in parse trees or partial parse trees implicit in the contents of a chart parser. The value of each traveling feature is a specification of the identity of a completed component (node). A completed node is a node that has all of its children assigned in accordance with a corresponding grammar rule.

Block 1100 assigns ("sets") the value of each traveling feature to a list containing the specification of the completed node corresponding to a grammar rule element 606 in FIG. 6 that is identified as an origin of each such respective traveling feature.

For the example shown in FIG. 11, a' corresponds to the node just completed. Step 1102 updates the value of each traveling feature to a list of the "calculated" values, in this example a list containing one value that is a specification of the identity of a completed component (node) and any existing values already associated with the parent node, which corresponds to node a* in FIG. 6.

The child node a', may have existing values of the traveling feature. These values correspond to third values of the traveling feature, 614 in FIG. 6. Step 1104 sets the value of the traveling feature to a list of the values associated with the parent node, corresponding to a* in FIG. 6 and these existing values of the traveling feature. For the example disclosed in FIG. 11, the calculated values of the traveling feature are already included in the values associated with the parent node prior to step 1104.

Figure 12:
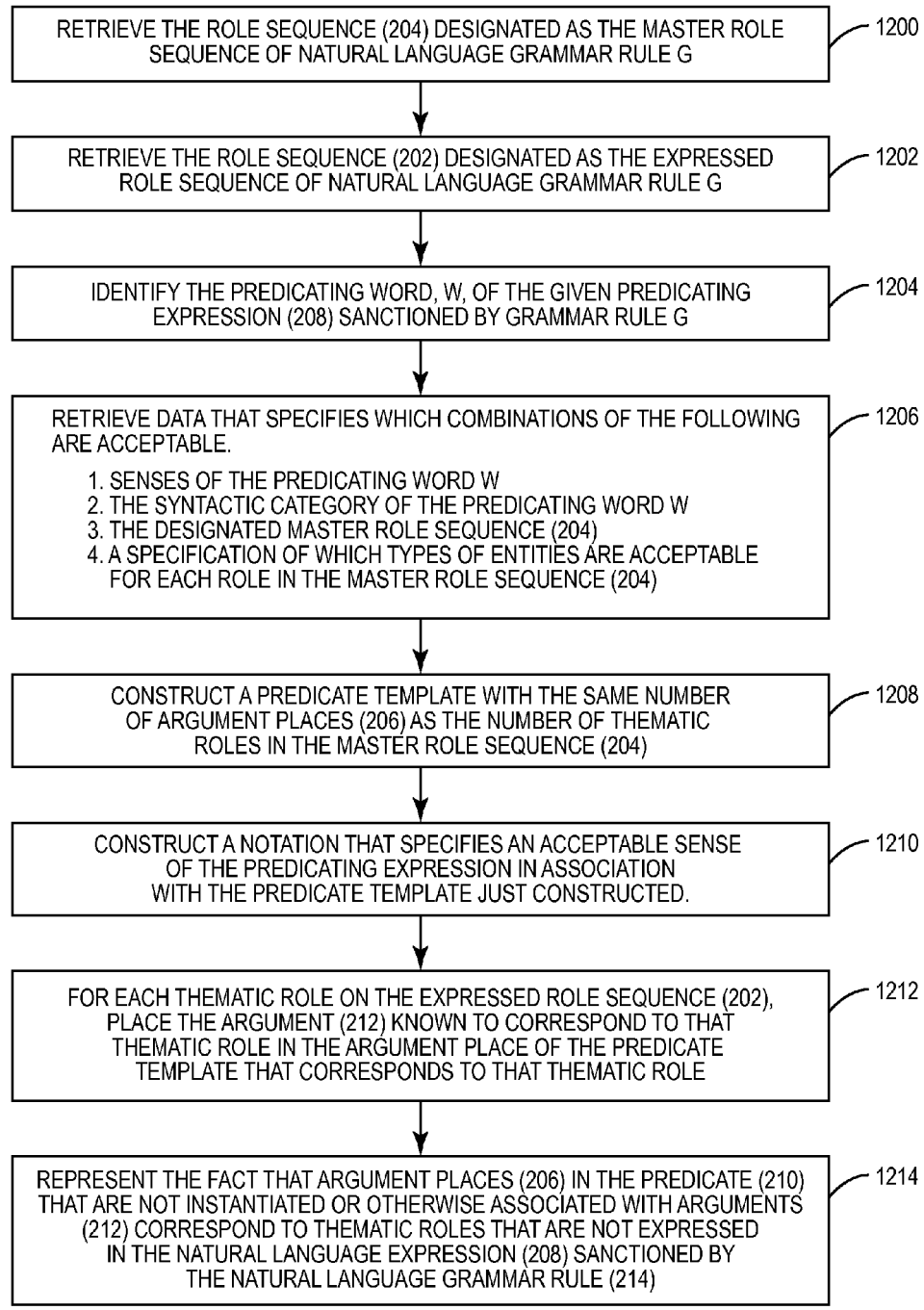
FIG. 12 is a flowchart showing the process to standardize the order in which arguments appear in each atomic logical predicate used as part of the knowledge representation regardless of the order in which those arguments are expressed in a natural language expression to which the predicate applies according to embodiments of the present invention.

FIG. 12 depicts exemplary steps taken to standardize the order in which arguments appear in each logical predicate used as part of the knowledge representation regardless of the order in which those arguments are expressed in a natural language expression to which the predicate applies. A central advantage of using predicate calculus for knowledge representation is that it can directly support inference and analysis. A key capability in a NLU system is to identify natural language expressions that have similar meaning or have the same meaning even though they are expressed using different words or using different word order. Inference processes may also be used, but ultimately it is desirable to establish a standard form for knowledge representations so that natural language expressions that result in the same expression in the knowledge representation language have the same meaning.

The approach described in FIG. 12 is used to construct predicate calculus expressions, specifically predicates, which are a basic expression in predicate calculus from which more complex expressions are composed. The predicates constructed in this approach take into account multiple aspects of meaning that apply to NLU, word sense (for both predicating and non-predicating words), the types of entities that can be referred to by each particular word, and the types of entities that can correspond to particular thematic roles in combination with the senses of predicating words (when applicable). One way to specify which combinations of thematic roles and types of entities are compatible for specified senses of predicating words (often verbs) is to use Prolog facts of the following form.

predArgTypes(<Predicating Word>,<Syntactic Category>,<Integer ID>,<Sense List>,<Types Spec>), where 1. (<Predicating Word> is a natural language word that is either a modifier or a verb, 2. <Syntactic Category> is one syntactic category of the natural language for which the predicating word may be used, 3. <Integer ID> is an identifier of a thematic role sequence that is to be used as a "master" role sequence for constructing the predicate representation of a natural language predicating expression (such as a sentence, adjective phrase, adverbial phrase, etc.), 4. <Sense List> is a list of identifiers of senses of the predicating word for which all the other information in the same predArgTypes (----) fact applies, and 5. <Types Spec> is list of lists, where each component list is itself a list of types of entities to which an natural language expression corresponding to a thematic role in the thematic role sequence specified by <Integer ID>. Specifically, if a list of types, is the K'th element of <Types Spec> then natural language expressions that correspond to the K'th thematic role in the thematic role sequence identified by <Integer ID> must each refer an entity or entities of at least one of the types listed on that K'th element of <Types Spec>.

The correspondence between thematic roles and natural language expressions is determined by the use of grammar rules that each specify a thematic role sequence to be used as the "master" thematic role sequence and a thematic role sequence that reflects the thematic roles actually expressed when that grammar rule is used. The example shown below is used to further explain this approach and to explain FIG. 12.

The following is a grammar rule for an English sentence of the form, "X was estimated using Y", where X and Y could be any simple or complex English expressions. This grammar rule is the same as shown above repeated here for convenience.

```
atomic---> [arg, verbGroup, using, arg].
featStruc(atomic---> [arg, verbGroup, using, arg],
    [ [senseType, [2], [doing] ],
    [ rID, [0], [676] ], [ topLev, [0], [yes] ],
    [ negated, [0,2], all ], [ passive, [2], [yes] ],
    [ case, [1], [sub] ], [ mID, [0,2], [10] ],
    [ roleSeq, [0], [11] ], [ role, [4], [inst]],
    [ ref, [4], [entity] ], [case, [4], [none,obj] ],
    [ role, [1], [theme] ], [ref, [1], [entity] ],
    [tense, [0,2], all ], [numPer, [1,2], [s1,s2,s3] ] ]).
```

The feature [mID, [0, 2], [10] ] is used to specify the thematic role sequence to be used as the master thematic role sequence with this grammar rule. The identifying integer is 10. The Prolog fact roleSeq(10, [eWhen, genAgent, manner, vg, theme, inst, ben, goal_purp, priorCause_mot]) lists the thematic roles in the particular sequence shown. This information, in any adequate form, is retrieved at block 1200 in FIG. 12. The feature [roleSeq, [0], [11]] in the grammar rule is used to retrieve the sequence of thematic roles that are actually expressed in an English expression sanctioned by this grammar rule, in this case the fact, roleSeq(11, [theme, vg, inst]). This is step taken that corresponds to block 1202 in FIG. 12. The element 'vg' on the list stands for "verbGroup", and is a place holder that does not correspond to any thematic role. The verbGroup component of an English sentence establishes the predication of that sentence and does not correspond to any complement in the sentence. Consequently, there is no argument in the logic predicate constructed corresponding to that verb group.

The predicating word for any example sentence of the form "X was estimated using Y" is the root form of the word 'estimated', which is 'estimate'. In block 1204 in FIG. 12 identifies this predicating word, which is used in block 1206 to retrieve the appropriate Prolog fact, described next. The data retrieved in this example that corresponds to the data mentioned in block 1206 of FIG. 12 is a fact of the form first argument of this predArgTypes fact, 'estimate' is the predicating word found at block 1204 of FIG. 12. The third argument, '10' is the identifier of the thematic role sequence to be used as the master thematic role sequence. The fourth argument is a list of identifiers, each of a sense of the predicating word. Any sense identified by an identifier on this list can be used with the other information given by the predArgType Prolog fact. The fifth argument, as explained above, specifies allowable types of entities to which the corresponding argument in the predicate being constructed may refer.

A variety of construction steps are possible to construct the predicate to represent the meaning of the English expression sanctioned by the grammar rule. One way begins with the construction of a predicate "template" that has a predicate name based on the predicating word and the sense in which it is being used. In this case the sense is that with identifying integer 1, so the predicate name is 'estimate[1]'. In the example, the predicate requires as many argument places as the length of the fifth argument of the predArgTypes(- - -) Prolog fact, minus 1 to account for the presence of 'na'. This construction results in the body of the predicate template '(ne,ne,ne,ne,ne,ne,ne,ne)'. This construction is referred to in block 1208 of FIG. 12. block 1210 of FIG. 12 can be implemented by constructing the expression 'estimate[1]', where '1' is the identifier of a sense of the predicating word that can be used with the other information given by the predArgType Prolog fact. The step corresponding to block 1212 in FIG. 12 is the step that ensures that the arguments of the predicate are placed in the standard order specified by the thematic role sequence (number 10) specified as the master. In this example, [theme, vg, inst] is the expressed role sequence and [eWhen, genAgent, manner, vg, theme, inst, ben, goal_purp, priorCause_mot] is the master role sequence. Since 'theme' appears as the fifth element of the master role sequence, the argument (which is a representation of whatever English expression corresponds to the X in 'X was estimated using Y') is placed in the fifth argument place of the predicate template. Similarly, the argument corresponding to 'inst' is placed in the sixth argument place. Letting arg1, arg2, etc. stand for the actual knowledge representations of the arguments of the predicate, the resulting representation of the meaning of the English expression is, 'estimate[1](ne,ne,ne,ne,arg1,arg2,ne, ne), where arg1 is the theme and arg2 is the instrument. All of the arguments, except the fifth and sixth have no expression in any sentence sanctioned by this grammar rule, so their places in the predicate are all held by 'ne' (not expressed), in accordance with the step of block 1214 in FIG. 12.

Independent analysis of each individual series of consecutive modifying expressions (independent from the rest of the

```
predArgTypes(<Predicating Word>,<Syntactic Category>,<Integer ID>,<Sense List>,<Types Spec>),
    as mentioned above. In this case the fact retrieved is
    predArgTypes(estimate,'main verb',10,[1],[[time],[entity],[entity],na,[entity],[entity],
                                            [entity],[entity],[entity]]).
```

The use of the type entity avoids placing any restriction on the type of entity or entities that can be denoted by the corresponding argument of the predicate to be constructed. In an implementation of a an NLU system restrictions need to be expressed in the fifth element of the fifth argument of the Prolog fact predArgTypes(estimate,'main verb', 10, [1], - - -) that is shown above to reflect this restriction. The natural language expression of which they are a part except for one "attachment" point—and independent from each other) may be performed, using a specification of which expressions and words may modify which other expressions and words and a list for each node in the chart that includes the sense of that node calculated from all combinations of senses of all alternative ordered child sets of that node. The data giving the specification of candidate modifier-modifiee pairs may be obtained from the natural language grammar itself when it is known with certainty, based on grammar design, that a particular node is a modifier of a particular one of its siblings. Traveling features may be used to gather the data needed to specify modifier-modifiee pairs when they are more distantly related syntactically. Noun compounds have an implicit regular syntactic structure that can be characterized as a binary tree down to the level of individual nouns or particular noun phrases. The combination of these three syntactic indicators of possible modifier-modifiee pairs provides wide coverage (perhaps exhaustive coverage depending on grammar design) of all possible pairs. Although grammar rules can provide data on many modifier-modifiee pairs, it is convenient to use traveling attributes to gather the modifier-modifiee data that could be gathered from individual grammar rules in addition to data on more distant syntactic relationships between potential modifiers and modifiees.

FIG. 9 depicts a recursive approach for finding a combination of modifier-modifiee pairs, [X,Y], respective senses for X and Y, and a specification of "how" X can modify Y given those senses for an input list of modifiers. The calculation of compatible combinations of modifier-modifiee pairs takes into account the syntactic relationships of the member natural language expressions, the senses of words (both predicating words such as verbs) and non-predicating words, the semantic relationships that "explain" or "account for" how each modifier can modify the modifiee to which it is paired, and ensures that any resulting connected networks of expressions that are members of modifier-modifiee pairs each use either the same or compatible senses for all occurrences of all those words and expressions. Block 902 of FIG. 9 calls a procedure (depicted in FIG. 10 and described below) that finds a modifiee, respective senses for X (one given modifier) and Y and a way in which X can modify Y given those senses.

The procedure of FIG. 9 is recursive because it calls itself at block 906 with all but the first modifier of the list it is given at each level of recursion. When an empty list is given as input this indicates that all modifiers have been successfully processed (each one has an assigned modifiee and the elements of each modifier-modifiee pair have assigned senses and a way in which X can modify Y). If conditional branch 904 fails then no solution for the reduced list (containing all but the first modifier X) for any combination of [X,Y], senses for X and Y and a way of X modifying Y exits and the entire procedure fails. When such a combination has been found at block 902 for X and at block 906 for all modifiers on the given list except X, then a complete solution has been found. The backtracking (here specified for a recursive procedure) is needed, rather than finding a solution for each modifier independently, because modifiers and modifies may participate in more than one modification relationship, so the senses assigned may be required to be the same or complementary for all modifiers and modifies on the given list.

FIG. 10 shows one way to organize that calculation for each modifier. Block 1002 in FIG. 10 retrieves a sense for the modifier and assigns it as the current value of X. Test 1004 in FIG. 10 fails when there are no more senses of X to try. Block 1006 of FIG. 10 retrieves all candidate modifiees for the current modifier assigned to X all at once. Block 1008 of FIG. 10 selects one of the candidate modifiees (one at a time) for the current modifier assigned to X from that list. If test 1010 fails then all combinations of senses for Y and ways that X can modify Y have been tried for the current combination of X and the assigned sense of X and the procedure backtracks to try another sense of X. Step 1012, if successful, retrieves a sense for Y. If test 1014 fails then there is no way that X can modify Y for the current combination of X, Y and their respective currently assigned senses, so the procedure backtracks to try another candidate modifiee Y. Step 1016 uses a procedure X_Can_Modify_Y (X,Y) that is given two senses X and Y and that determines on criteria particular to the specific input arguments X and Y, how X can modify Y. Each time step 1016 in FIG. 10 is used for the same modifier, the same modifiee and the same respective senses for them it tries to find a different "reason" why X can modify Y under those senses. There are many ways this can be implemented to use knowledge in a knowledge base.

For example, the phrase 'on a hill' can modify 'telescope' because any physical object can physically rest on the hill due to gravity and any physical object can be anchored to a hill by having part of that object submerged in the material of that hill. Either of these reasons alone is sufficient to provide an interpretation for 'telescope on a hill'. Also they are compatible "complementary" senses that can both be true of a single situation. The phrase 'shadow on a hill' would have a different interpretation, a different relationship between 'shadow' and 'hill' because 'shadow' is not a physical object, but rather a relative absence of light in comparison to adjacent surface areas on the hill. Such "explanations" may be oversimplifications for particular applications of an NLU system or as sophisticated as needed.

The point for this example is that different such explanations result in different senses of the predicating word 'on'. This is typical of prepositions, which can have a wide variety of interpretations depending on the types of the entities they take as arguments. If the conditional branch 1018 fails that indicates that no more ways of explaining how X can modify Y for the given modifier and modifiee and their respective senses can be found. In this case the procedure backtracks to try another sense for Y. If the conditional branch 1018 succeeds, then a modifiee, Y, a combination of respective senses for X and Y, and a way in which X can modify Y have been found and the procedure exits successfully. The procedure when implemented in Prolog, can be "backtracked into" in a manner that causes it to behave as if conditional branch 1018 had failed even though an answer was successfully returned. This may produce additional answers, with the procedure acting as a "generator" of multiple answers until no more can be found. Alternatively, if the procedure is "called" again, it begins over at "start".

As mentioned in the Summary under Traveling Features, the primary use of travelling features in the current system is to identify English words and phrases that are potential modifiers of other words and phrases strictly by virtue of syntactic considerations. This is useful because it permits a simplification of the natural language grammar, which in turn reduces the number of parse trees that typically must be constructed. In general, traveling features can be used to indicate that any particular nodes or types of nodes, or nodes with any particular properties are below a common ancestor in a parse tree, "before that parse tree is constructed". The values of traveling features are determined during chart construction. A pipelined NLU system that creates one parse tree at a time and then passes that parse tree as input to a stage of processing that deals with semantic analysis constructs as many parse trees as needed to distinguish all the combinations of "modifier attachment", such as prepositional phrases and dependent clauses. Under such an approach and similar ones the parse tree's structure is entirely responsible for showing which nodes modify which other nodes. The same choices for constructing alternative sub-trees reflecting this modification can be encountered many times while constructing parse trees.

Figure 13:
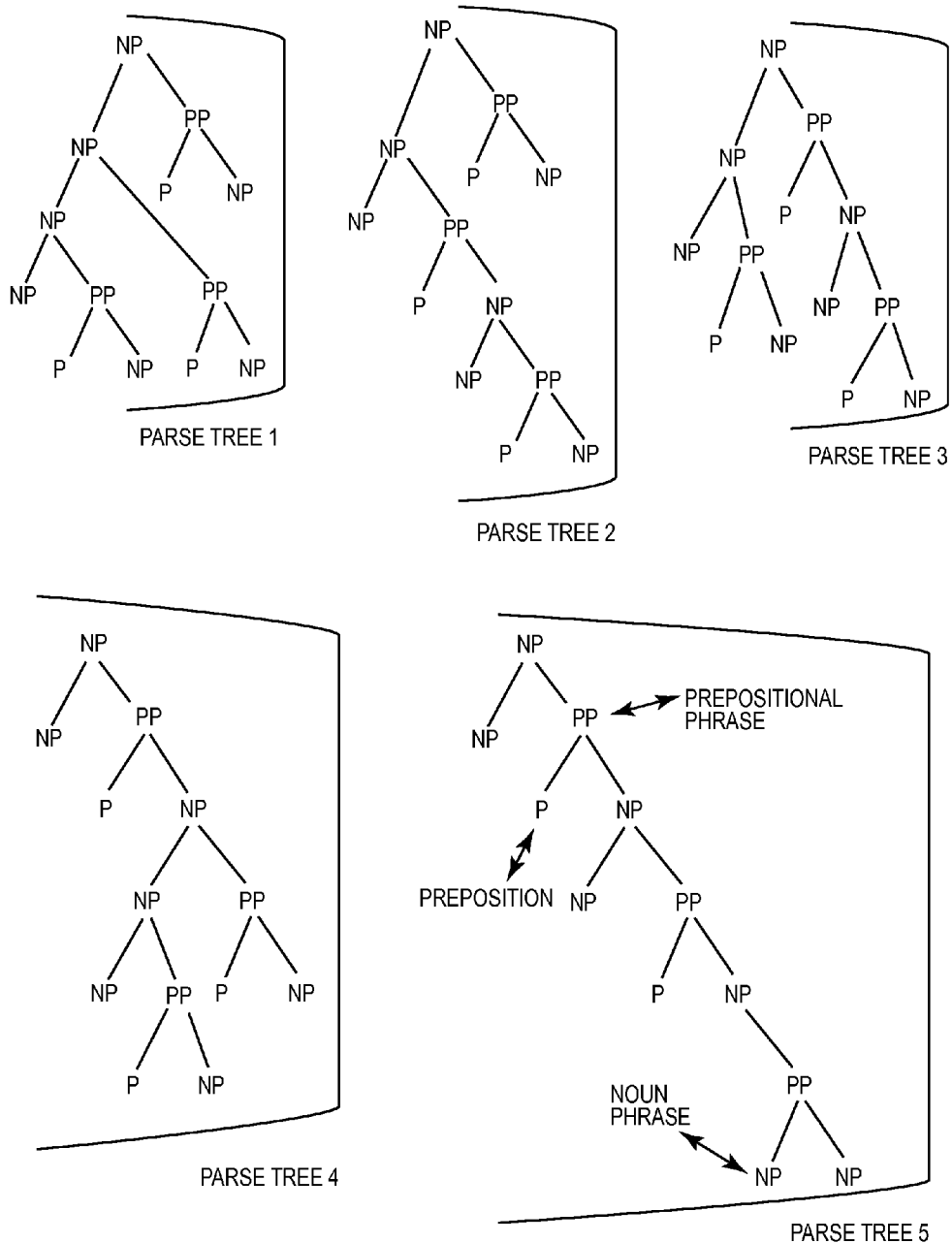
FIG. 13 is a conceptual diagram showing an exemplary five (5) parse trees that, without the use of traveling attributes would need to be constructed, perhaps repeatedly for a given natural language input expression, wherever the sub-expression corresponding to them has a corresponding sub-tree in a parse tree being constructed for the entire input expression according to embodiments of the present invention.

If these choices are encountered K times during the construction of multiple parse trees and there are N combinations of modifications then the total number of parse trees is increased by [N×(K−1)]) times. Since multiple situations requiring alternative modification patterns can occur in an input expression, this can drastically increase the overall number of parse trees. In the current system, traveling features enable series of "post nominal modifiers" such as prepositional phrases and dependent phrases to each be interpreted independently of the rest of the parse trees in which they occur and independently of each other. An example is the noun phrase, "The man on the hill with the telescope with the brown spot." There are three prepositional phrases, 'on the hill', 'with the telescope', and with the brown spot'. There are six plausible interpretations of the phrase, depending on which prepositions modify which noun phrases. Five alternative parse trees are shown in FIG. 13. If these five parse trees must be constructed even two times, because of other structures of parse trees of which those parse trees can be a part, the number of total parse trees will be increased by 8 and other sub-trees with alternative modification patterns may each need to constructed more times, thus amplifying this inefficiency. It has been reported that some sentences in well known publications between 20 and 30 words in length can individually result in thousands of parse trees. Moreover, the use of traveling attributes provides the convenience of specifying a simpler more intuitive grammar. For instance a grammar rule such as np2--->[typeNameOrS, seriesPostNominalMods]

can be used where the category seriesPostNominalMods is a consecutive series of prepositional phrases or dependent clauses. The parse trees constructed when this rule is used are "flat" under a node of category seriesPostNominalMods. Such a node simply has one child per post nominal modifier, instead of one of the alternative structures in a sub-tree as shown in FIG. 13. This makes the grammar simpler and more intuitive and, reduces the number of parse trees that need to be constructed as previously described. Traveling features support this process by providing a list of potential modifiees for each modifier during chart construction. FIG. 11 shows the basic steps taken to determine the values of traveling feature structures. Features are added to the grammar to specify at which nodes a value for a feature structure is created. Note that nodes are referred to as "components" in FIG. 11. Currently three traveling features are used in a prototype system under development, modt, ntar, and pmod. Modt has values that specify nodes in the chart of any syntactic category that acts as a modifier of nominal expressions and that appear to the left of the expression they modify.

An example of these syntactic categories is that of adjectives that appear left of their modifiees (as most adjectives do). Ntar takes as its values nodes that are of some kind of nominal category (not a predicating word), such as nouns and noun phrases. Pmod takes as values nodes that are modifiers of nominal expressions and that can appear to the right of the expression they modify. Examples are prepositions and dependent clauses. The example, described above involved three prepositional phrases, which are processed as values of the traveling feature of the type pmod. A value of a traveling feature can originate at a node that corresponds to a component (node) in the chart that has just been completed. A node is completed when it has its last child used to extend it. In a top-down chart parser, which the current system uses, the child component may itself be required to already be a complete component (node) in order to be used to extend another incomplete node. When a node is extended, the result is considered to be a distinct node, consequently a series of complete child nodes extend nodes (producing new nodes) until all children have been added and a complete "parent" node results.

Travelling attributes are handled when nodes are extended whether that extension results in a complete node or not. However, the values of travelling attributes are only collected and stored for subsequent retrieval when the last extension results in a complete parent node. All potential parse trees constructed from nodes in the chart consist only of complete nodes. Each these processes, handling traveling attributes at all node extensions and collecting and storing them when complete nodes are produced is described in detail below. The creation of traveling feature value that "travel" up from a node just completed can be specified by the notation [ATT, [0, - -], [origin]], where ATT is the type of travelling attribute such as modt. It "travels up" by being passed from each child to the child's parent and that parent's parent etc. as nodes are extended in the chart. As described in block 1102 of FIG. 11, the value created for ATT is some specification of the node just completed. In the current system [ATT, [0, - -], [origin]], is replaced by [ATT, [0,- -], [[[Cat,S,E, ID]]]], where ID is an identifier of the node just completed.

For example, [modt, [0], [origin]] would be replaced by [modt, [0], [[[preNounMod, 5, 9, 77]]]] if the node just completed was of category preNounMod with identifier 77 and occurred in the input expression between positions 5 and 9. There is one other way that a value of a traveling feature can originate. It can originate at a node that corresponds to one of the elements of the right hand side of a grammar rule. The notation currently used for this is [ATT, [N1,N2,N3 - -], [[org, Ni]]], where ATT is the traveling attribute type and Ni is a member of the list [N1,N2,N3 - -]. For example, if the parent node has the feature [modt,[1,2],[[org,1]]], then this feature is initially replaced with [modt,[1,2],[[[preNounMod,1,4,436]]]], where the child node [preNounMod,1,4, 436] is the only value (so far) of the modt attribute whose scope in the parent node is [1,2]. There are so many parentheses around the node specification in the implementation from which this example was due to details of a current implementation that are specific to that implementation. In principle only two pairs of parentheses are needed to specify a list of values when each value is represented with one pair. In this case a node is represented with one pair. In this example, the node identifier is 436 and the natural language expression corresponding to this node of category preNounMod is between positions 1 and 4 of the input natural language expression.

A parent node is allowed to have both a specification of the origination of a traveling attribute and another specification for the same attribute that has its own specified scope. Block 1104 handles the case in which both are present if the scope of the non-originating specification contains the integer 0. The integer 0 indicates that any value that comes from an extension of any k'th child of the parent where the integer k is in the scope of that specification is passed up to the parent of the parent. For instance if both [modt, [0], [origin]] and [modt, [0,2,4], [[[cat1,2,3,77],[cat2,5,8,78]]]] appear at the parent node and the parent node is [catp,1,9,55], then the two modt specifications are combined into [modt, [0,2,4], [[[catp,1,9,55],[cat1,2,3,77],[cat2,5,8,78]]]].

Block 1106 completes the construction of traveling attributes for a node by combining the traveling attributes of each child node being used to extend the parent node in the chart with the traveling attributes that are already in the parent node just prior to that extension. If the integer k is in the scope of traveling attribute, ATT, of the parent node and 0 is in the scope of that same attribute of the k'th child used to extend the parent node then the value of the parent's ATT becomes the union of whatever values the parent node had for ATT before extension and the k'th child's values of ATT. For example, if the parent has [modt, [2,4], [[[cat1,1,3,55],[cat2,7,8,56]]]] and the second child has [modt,[0,2,4], [[[cat3,6,10,80],[cat4,17,18,81]]]] then the resulting value of modt for the extended parent after it is extended by this child node is

[modt,[2,4],[[[cat1,1,3,55],[cat2,7,8,56],[cat3,6,10,80], [cat4,17,18,81]]]].

This combination takes place because the '2' in [2,4], the scope of ATT for the parent indicates that the modt values of the second child are to be combined with the modt values of the parent if the child "wants" to pass any up. That the child is to pass them up is indicated by the '0' in [0,2,4], the scope for modt in the child.

When a node, N, is complete (all the children it can have according to the applicable grammar rule have been used to extend that node) then there may be a variety of traveling attributes with corresponding lists of values for each one at that node. The fact that they have "arrived" at N indicates that a path from the origin of each value to N exists. The fact that values of two or more attributes arrive at a node indicates a syntactic relation between their points of origin. For example, modt means that each of its values is a potential modifier and ntar indicates that each of its values is a word or expression that can be modified by a modt. By arranging the permitted paths appropriately, when any value of a modt arrives at the same completed node as any value of an ntar it indicates that the value of the modt can modify the value of the ntar. The value of this derives from the fact that no parse trees have yet been constructed. Their construction has not yet even begun; however the information is available at this point that specifies which modifiers can modify which modifiees strictly based on their syntactic relation. The method of using traveling attributes in chart construction may have many other uses in addition, where different values (rather than only nodes in the chart) are used. There is no restriction of the types of information that can be included in the "values" of traveling attributes. Basically, any information that is available at one point (one node) during the construction of the chart can be passed up as desired to its ancestors. Also travelling features could also be passed from parent to child when nodes of "zero length" are created. For example, as described above, when nodes 1, 2, 5, and 10 are created it could be arranged for traveling attributes to be passed from the parent node that is to subsequently to be extended to the first child used to extend that parent. This may not be required when using travelling features to identify modifier-modifiee pairs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   using at least a processor and memory for performing syntactic and semantic analysis by:
   receiving a natural language predicating expression;
   determining, by the processor, a first thematic role sequence;
   determining, by the processor, a second thematic role sequence;
   applying, by the processor, the first thematic role sequence to the natural language predicating expression;
   applying, by the processor, the second thematic role sequence to the natural language predicating expression for determining a standardized order of thematic roles contained in the first thematic role sequence;
   constructing, by the processor, a representation of an artificial language predicating expression with the standardized order of thematic roles contained in the first thematic role sequence in which predicate arguments are represented using the applied second thematic role sequence,
   wherein the representation of the artificial language predicating expression comprises a specification of an artificial logical predicate and a specification of the predicate arguments of the logical predicate, wherein each of the arguments corresponds to at least one thematic role in the first thematic role sequences; and
   displaying in a user interface the representation of the artificial language predicating expression based on at least one thematic role included in the first thematic role sequence and the second thematic role sequence,
   wherein constructing the representation of an artificial language predicating expression with the standardized order by the processor, in which predicate arguments are presented, thereby constructing the representation of an artificial language predicating expression with the standardized order by the processor improves the processing speed and efficiency of syntactic and semantic analysis at the processor.

2. The method of claim 1, further comprising receiving a grammar rule, wherein the first thematic role sequence and the second thematic role sequence are associated with the grammar rule.

3. The method of claim 2, further comprising:
   parsing the natural language predicating expression into a plurality of natural language predicating expression parts using the grammar rule;
   determining a correspondence between at least one first thematic role sequence element and at least one of the natural language predicating expression parts;
   receiving a correspondence between at least one second thematic role sequence element and at least one artificial language predicating expression argument place; and
   determining an order of at least one artificial language predicating expression argument based on determining the correspondence between at least one first thematic role sequence element and at least one of the natural language predicating expression part and based on receiving the correspondence between at least one second thematic role sequence element and at least one artificial language predicating expression argument place.

4. The method of claim 1, further comprising:
   receiving a first data structure representing at least a partial meaning for each one of at least one of the natural language predicating expression parts;
   receiving at least one second data structure representing at least a partial meaning for an artificial language predicating expression argument, wherein the artificial language predicating expression argument corresponds to a second thematic role sequence element;

receiving a specification of the identity of an element of the second thematic role sequence that corresponds to the at least one second data structure;

assigning the first data structure for each one of the at least one natural language predicating expression part to a corresponding one of at least one artificial language predicating expression argument place based on determining the correspondence between at least one first thematic role sequence element and the at least one of the natural language predicating expression part and based on receiving the correspondence between the at least one second thematic role sequence element and the at least one artificial language predicating expression argument place; and assigning each of the received at least one second data structure to the artificial predicating expression argument place of the corresponding identified element of the second thematic role sequence.

5. The method of claim 4, wherein assigning the first data structure representing at least the partial meaning for each one of the at least one of natural language predicating expression parts to the plurality of artificial language predicating expression argument places, comprises establishing a correspondence between each one of the at least one first thematic role sequence elements and at least one of the at least one second thematic role sequence elements.

6. The method of claim 1, wherein each one of the at least one first thematic role sequence elements is the at least one of the second thematic role sequence elements.

7. The method of claim 1, further comprising storing the translated natural language predicating expression in a database.

8. The method of claim 1, further comprising receiving the natural language predicating expression in a user interface.

9. A system comprising:
at least a processor and memory comprising a natural language parser, the natural language parser being configured to:
perform, by the processor, syntactic and semantic analysis;
receive, by the processor, a natural language predicating expression;
determine, by the processor, a first thematic role sequence;
determine, by the processor, a second thematic role sequence;
apply, by the processor, the first thematic role sequence to the natural language predicating expression;
apply, by the processor, the second thematic role sequence to the natural language predicating expression for determining a standardized order of thematic roles contained in the first thematic role sequence; and
construct, by the processor, a representation of an artificial language predicating expression with the standardized order of thematic roles contained in the first thematic role sequence in which predicate arguments are represented by using the applied second thematic role sequence,
wherein the representation of the artificial language predicating expression comprises a specification of an artificial logical predicate and a specification of the predicate arguments of the logical predicate, wherein each of the arguments corresponds to at least one thematic role in the first thematic role sequences; and a user interface that displays the representation of the artificial language predicating expression based on at least one thematic role included in the first thematic role sequence and the second thematic role sequence,
wherein the construction of the representation of an artificial language predicating expression with the standardized order by the processor, in which predicate arguments are presented, thereby construction of the representation of an artificial language predicating expression with the standardized order by the processor improves the processing speed and efficiency of syntactic and semantic analysis at the processor.

10. The system of claim 9, wherein the natural language parser is further configured to receive a grammar rule, wherein the first thematic role sequence and the second thematic role sequence are associated with the grammar rule.

11. The system of claim 10, wherein the natural language parser is further configured to:
parse the natural language predicating expression into a plurality of natural language predicating expression parts using the grammar rule;
determine a correspondence between at least one first thematic role sequence element and at least one of the natural language predicating expression parts; and
receive a correspondence between at least one second thematic role sequence element and at least one artificial language predicating expression argument place; and
determine an order of at least one artificial language predicating expression argument based on determining the correspondence between at least one first thematic role sequence element and at least one of the natural language predicating expression part and based on receiving the correspondence between at least one second thematic role sequence element and at least one artificial language predicating expression argument place.

12. The system of claim 9, wherein the natural language parser is further configured to:
receive a first data structure representing at least a partial meaning for each one of at least one of the natural language predicating expression parts;
receive at least one second data structure representing at least a partial meaning for an artificial language predicating expression argument, wherein the artificial language predicating expression argument corresponds to a second thematic role sequence element;
receive a specification of the identity of an element of the second thematic role sequence that corresponds to the at least one second data structure;
assign the first data structure for each one of the at least one natural language predicating expression parts to a corresponding one of at least one artificial language predicating expression argument place based on determining the correspondence between at least one first thematic role sequence element and the at least one of the natural language predicating expression part and based on receiving the correspondence between the at least one second thematic role sequence element and the at least one artificial language predicating expression argument place; and
assign each of the received at least one second data structure to the artificial predicating expression argument place of the corresponding identified element of the second thematic role sequence.

13. The system of claim 9, wherein the natural language parser is further configured to establish a correspondence between each one of the at least one first thematic role sequence elements and at least one of the at least one second thematic role sequence elements.

14. The system of claim 9, wherein each one of the at least one first thematic role sequence elements is the at least one of the second thematic role sequence elements.

15. The system of claim 9, wherein the processor is further configured to store the translated natural language predicating expression in a database.

16. The method of claim 9, wherein the processor is further configured to receive the natural language predicating expression in a user interface.

17. A computer program product comprising a non-transitory computer readable storage medium having program instructions embodied therewith, the program instructions executable by a computing device to cause the computing device to:
perform, by the computing device, syntactic and semantic analysis;
receive, by the computing device, a natural language predicating expression;
determine, by the computing device, a first thematic role sequence;
determine, by the computing device, a second thematic role sequence;
apply, by the computing device, the first thematic role sequence to the natural language predicating expression;
apply, by the computing device, the second thematic role sequence to the natural language predicating expression for determining a standardized order of thematic roles contained in the first thematic role sequence;
construct, by the computing device, a representation of an artificial language predicating expression with the standardized order of thematic roles contained in the first thematic role sequence in which predicate arguments are represented by using the applied second thematic role sequence,
wherein the construction of the representation of an artificial language predicating expression with the standardized order by the processor, in which predicate arguments are presented thereby construction of the representation of an artificial language predicating expression with the standardized order by the processor improves the processing speed and efficiency of syntactic and semantic analysis at the processor; and
display, in a user interface of the computing device, the representation of the artificial language predicating expression based on at least one thematic role included in the first thematic role sequence and the second thematic role sequence,
wherein the representation of the artificial language predicating expression comprises a specification of an artificial logical predicate and a specification of the predicate arguments of the logical predicate, wherein each of the arguments corresponds to at least one thematic role in the first thematic role sequences.

18. The computer program product of claim 17, wherein the program instructions are executable by the computing device to cause the computing device to receive a grammar rule, wherein the first thematic role sequence and the second thematic role sequence are associated with the grammar rule.

19. The computer program product of claim 18, wherein the program instructions are executable by the computing device to cause the computing device to:

parse, by the computing device, the natural language predicating expression into a plurality of natural language predicating expression parts using the grammar rule;
determine, by the computing device, a correspondence between at least one first thematic role sequence element and at least one of the natural language predicating expression parts;
receive, by the computing device, a correspondence between at least one second thematic role sequence element and at least one artificial language predicating expression argument place; and
determine, by the computing device, an order of at least one artificial language predicating expression argument based on determining the correspondence between at least one first thematic role sequence element and at least one of the natural language predicating expression part and based on receiving the correspondence between at least one second thematic role sequence element and at least one artificial language predicating expression argument place.

20. The computer program product of claim 17, wherein the program instructions are executable by the computing device to cause the computing device to:
receive, by the computing device, a first data structure representing at least a partial meaning for each one of at least one of the natural language predicating expression parts;
receive, by the computing device, at least one second data structure representing at least a partial meaning for an artificial language predicating expression argument, wherein the artificial language predicating expression argument corresponds to a second thematic role sequence element;
receive, by the computing device, a specification of the identity of an element of the second thematic role sequence that corresponds to the at least one second data structure;
assign, by the computing device, the first data structure for each one of the plurality of natural language predicating expression parts to a corresponding one of at least one artificial language predicating expression argument place based on determining the correspondence between at least one first thematic role sequence element and the at least one of the natural language predicating expression part and based on receiving the correspondence between the at least one second thematic role sequence element and the at least one artificial language predicating expression argument place; and
assign, by the computing device, each of the received at least one second data structure to the artificial predicating expression argument place of the corresponding identified element of the second thematic role sequence.

21. The computer program product of claim 20, wherein the program instructions are executable by the computing device to cause the computing device to assign the first data structure representing at least the partial meaning for each one of the at least one of natural language predicating expression parts to the plurality of artificial language predicating expression argument places, comprises establishing a correspondence between each one of the at least one first thematic role sequence elements and at least one of the at least one second thematic role sequence elements.

22. The computer program product of claim 17, wherein each one of the at least one first thematic role sequence elements is the at least one of the second thematic role sequence elements.

23. The computer program product of claim 17, wherein the program instructions are executable by the computing device to cause the computing device to store, by the computer programming product, the translated natural language predicating expression in a database.

24. The computer program product of claim 17, wherein the program instructions are executable by the computing device to cause the computing device to receive, by the computer programming product, the natural language predicating expression in a user interface.

* * * * *